(12) United States Patent
Lee

(10) Patent No.: US 7,347,480 B2
(45) Date of Patent: Mar. 25, 2008

(54) ELECTROMOTIVE SUNVISOR ASSEMBLY OF A VEHICLE AND THE METHOD THEREOF

(75) Inventor: Chang-Seop Lee, Seongbuk-gu (KR)

(73) Assignee: QLT Co., Ltd, Seoul (KR)

( * ) Notice: Subject to any disclaimer, the term of this patent is extended or adjusted under 35 U.S.C. 154(b) by 0 days.

(21) Appl. No.: 11/596,139

(22) PCT Filed: Mar. 22, 2005

(86) PCT No.: PCT/KR2005/000832

§ 371 (c)(1),
(2), (4) Date: Nov. 9, 2006

(87) PCT Pub. No.: WO2005/108140

PCT Pub. Date: Nov. 17, 2005

(65) Prior Publication Data

US 2007/0228765 A1     Oct. 4, 2007

(30) Foreign Application Priority Data

May 11, 2004    (KR) .................. 10-2004-0033141

(51) Int. Cl.
*B60J 3/02*    (2006.01)
(52) U.S. Cl. ............... 296/97.4; 296/97.8; 296/97.11
(58) Field of Classification Search ............. 296/97.4, 296/97.8, 97.11
See application file for complete search history.

(56) References Cited

U.S. PATENT DOCUMENTS

| 3,226,151 A | * | 12/1965 | Reuther | ................ 280/6.159 |
|---|---|---|---|---|
| 5,031,952 A | | 7/1991 | Miyamoto et al. | |
| 7,108,307 B1 | * | 9/2006 | Sahara et al. | ............ 296/97.4 |
| 7,140,664 B2 | * | 11/2006 | Asai | ....................... 296/97.8 |
| 7,275,778 B2 | * | 10/2007 | Asai | ..................... 296/97.11 |
| 2006/0214463 A1 | * | 9/2006 | Sahara et al. | ............ 296/97.4 |

FOREIGN PATENT DOCUMENTS

| JP | 62-210122 | 9/1987 |
|---|---|---|
| JP | 2-200518 | 8/1990 |
| JP | 8-2251 | 1/1996 |
| KP | 1998-069330 | 10/1998 |
| KR | 10-1998-052269 | 9/1998 |

OTHER PUBLICATIONS

International Search Report for Application No. PCT/KR2005/000832, dated Jul. 12, 2005.

* cited by examiner

*Primary Examiner*—Dennis H. Pedder
*Assistant Examiner*—Mike Hernandez
(74) *Attorney, Agent, or Firm*—Lahive & Cockfield, LLP

(57) ABSTRACT

Disclosed is an electromotive sunvisor assembly of a vehicle and a method thereof in which a visor body is automatically movable to the outside of an overhead storage room and can be pivoted at a moving shielding site. The electromotive sunvisor assembly of a vehicle comprises an upper guide bar and a lower guide bar. An upper driving member is glidingly disposed at the upper guide bar. A lower driving member is glidingly disposed at the lower guide bar. A rotary shaft is extended from the lower driving member in a lateral direction. A mounting bar is rotatably disposed at the rotary shaft and a visor body is fixed thereto. A rotational operation slat is formed protrudently from the mounting bar. A link is axially connected to one side of the upper driving member and the other end thereof is axially connected to the rotational operation slat.

19 Claims, 23 Drawing Sheets

[Fig. 1]
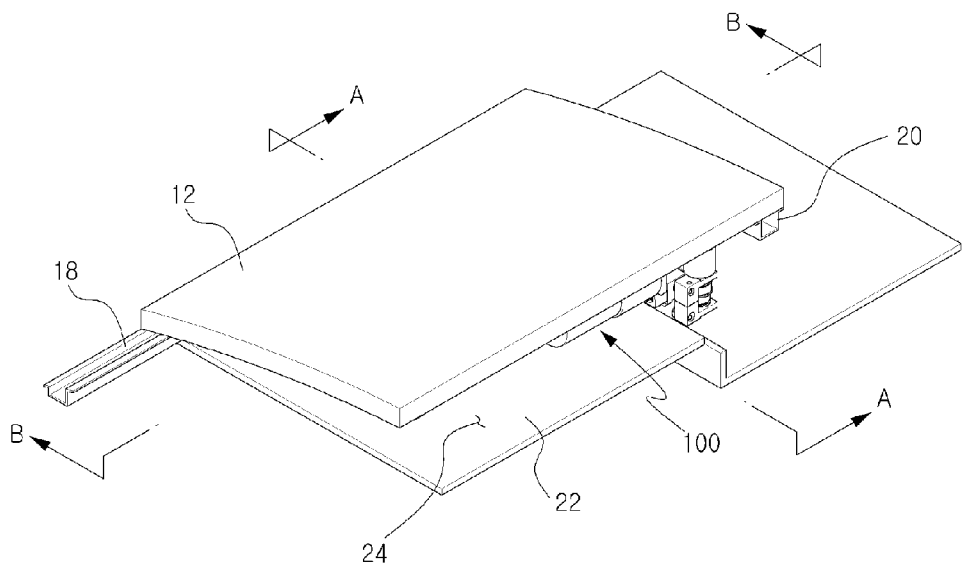
[Fig. 2]
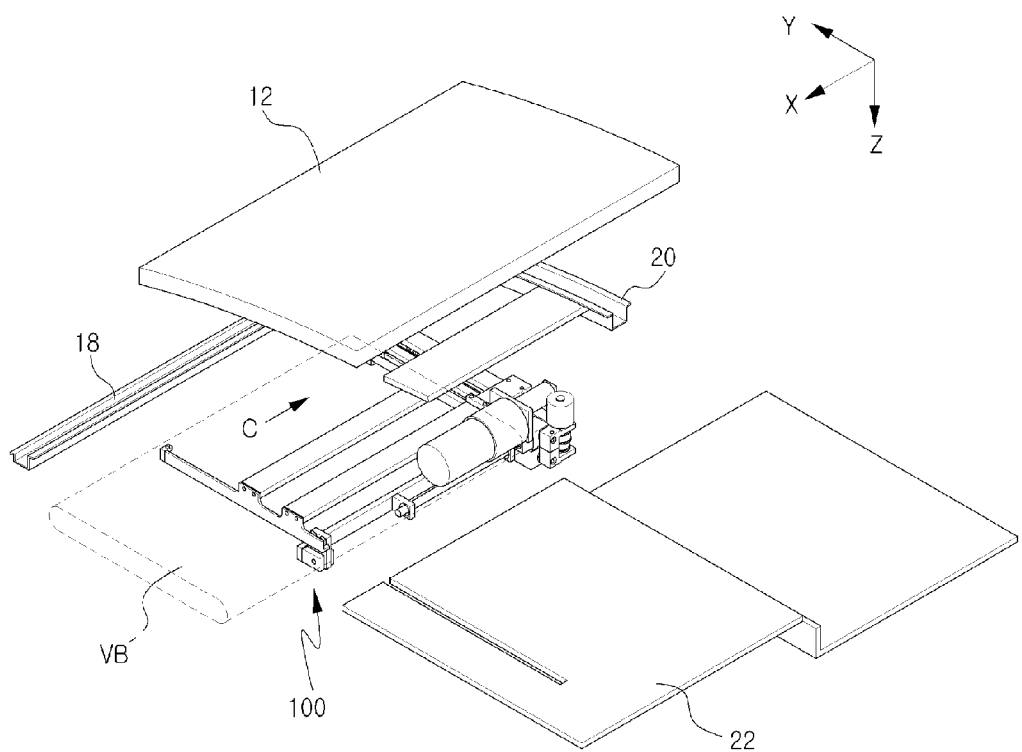

[Fig. 3]
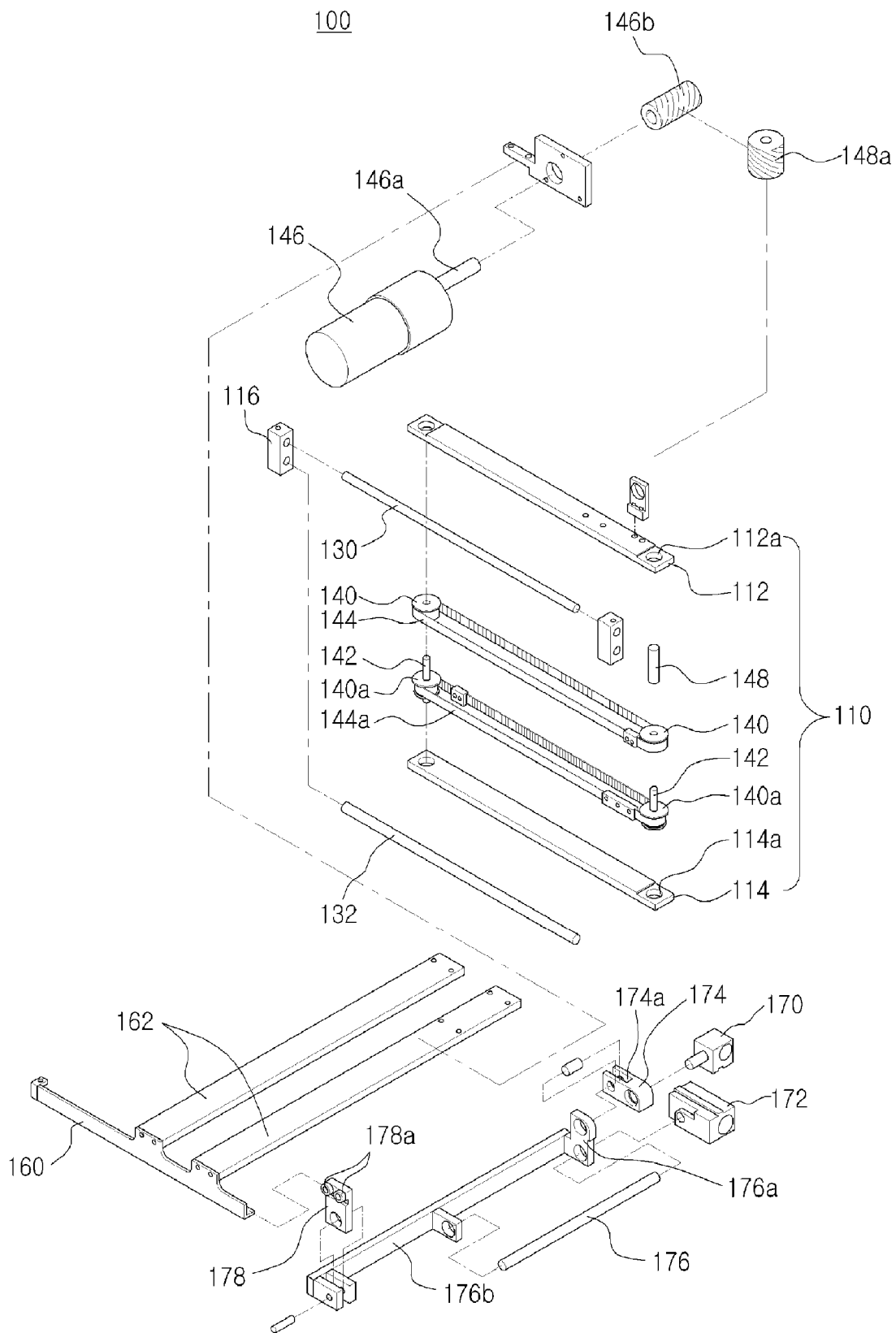

[Fig. 4]
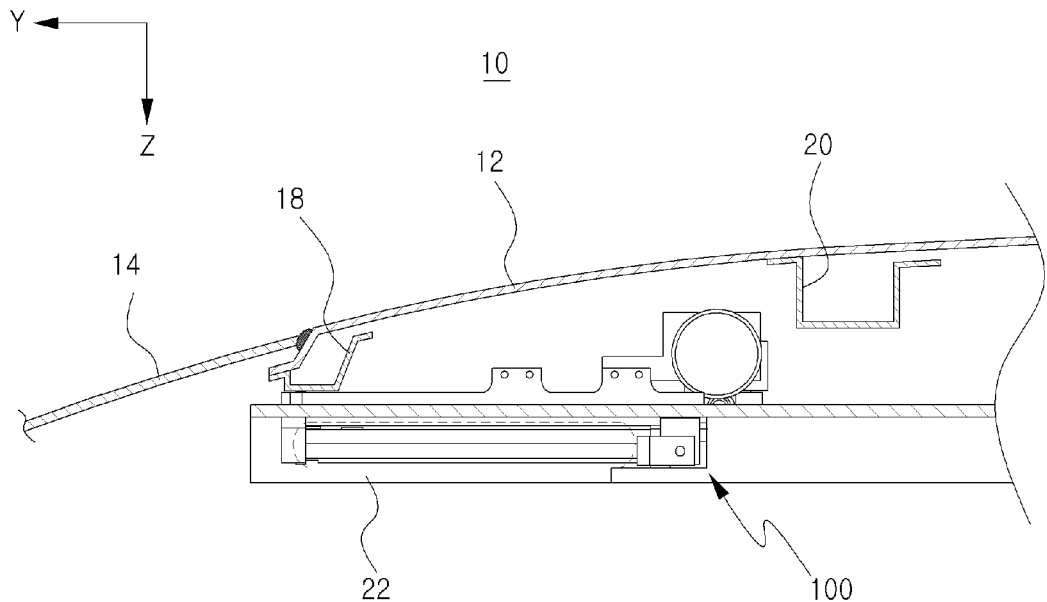
[Fig. 5]
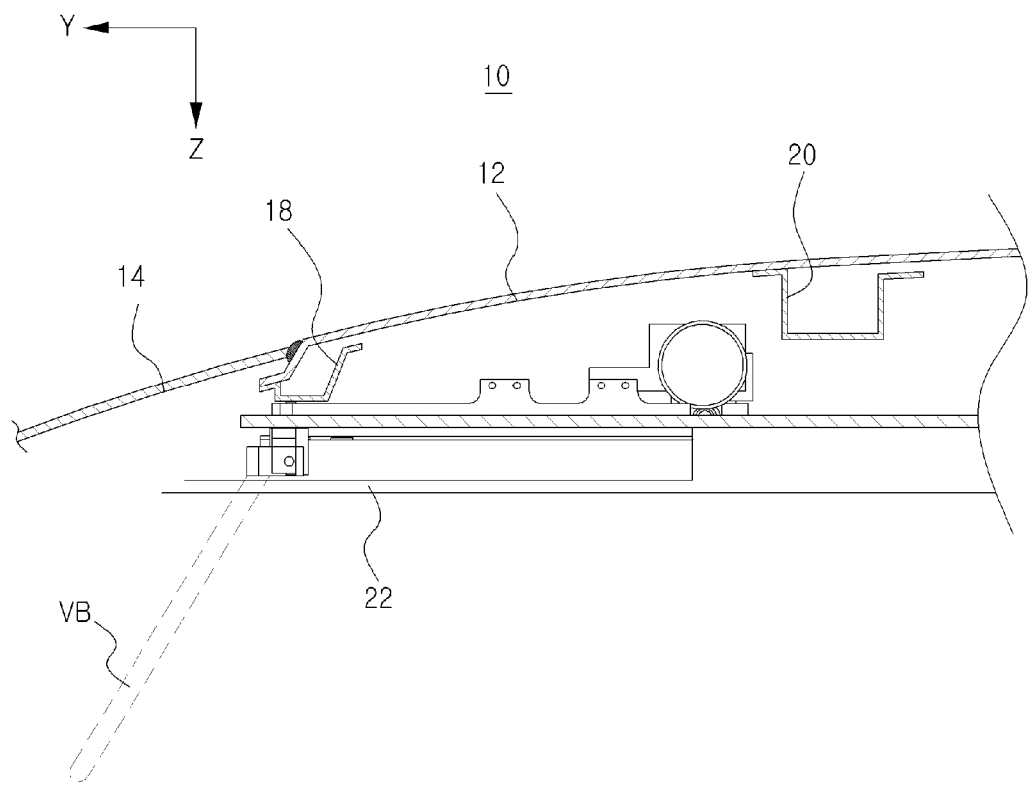

[Fig. 6]
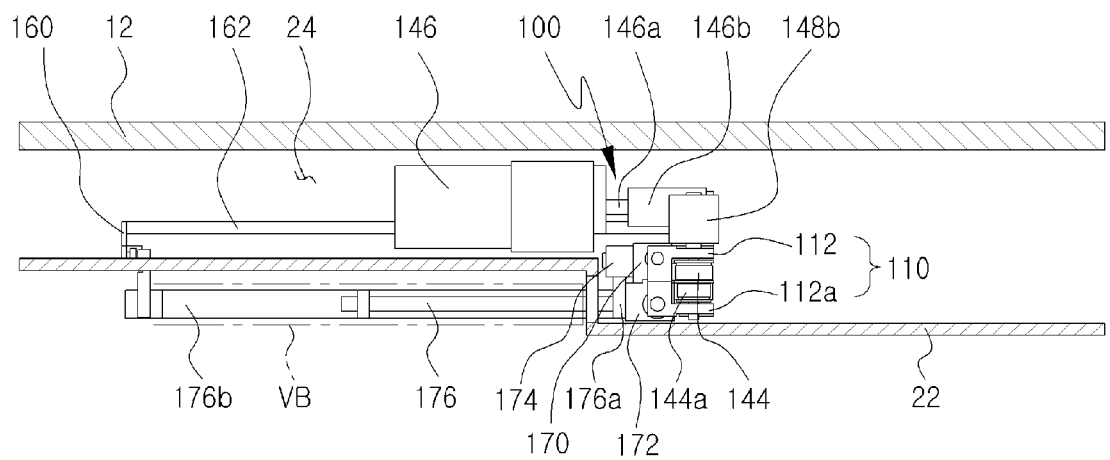

[Fig. 7]
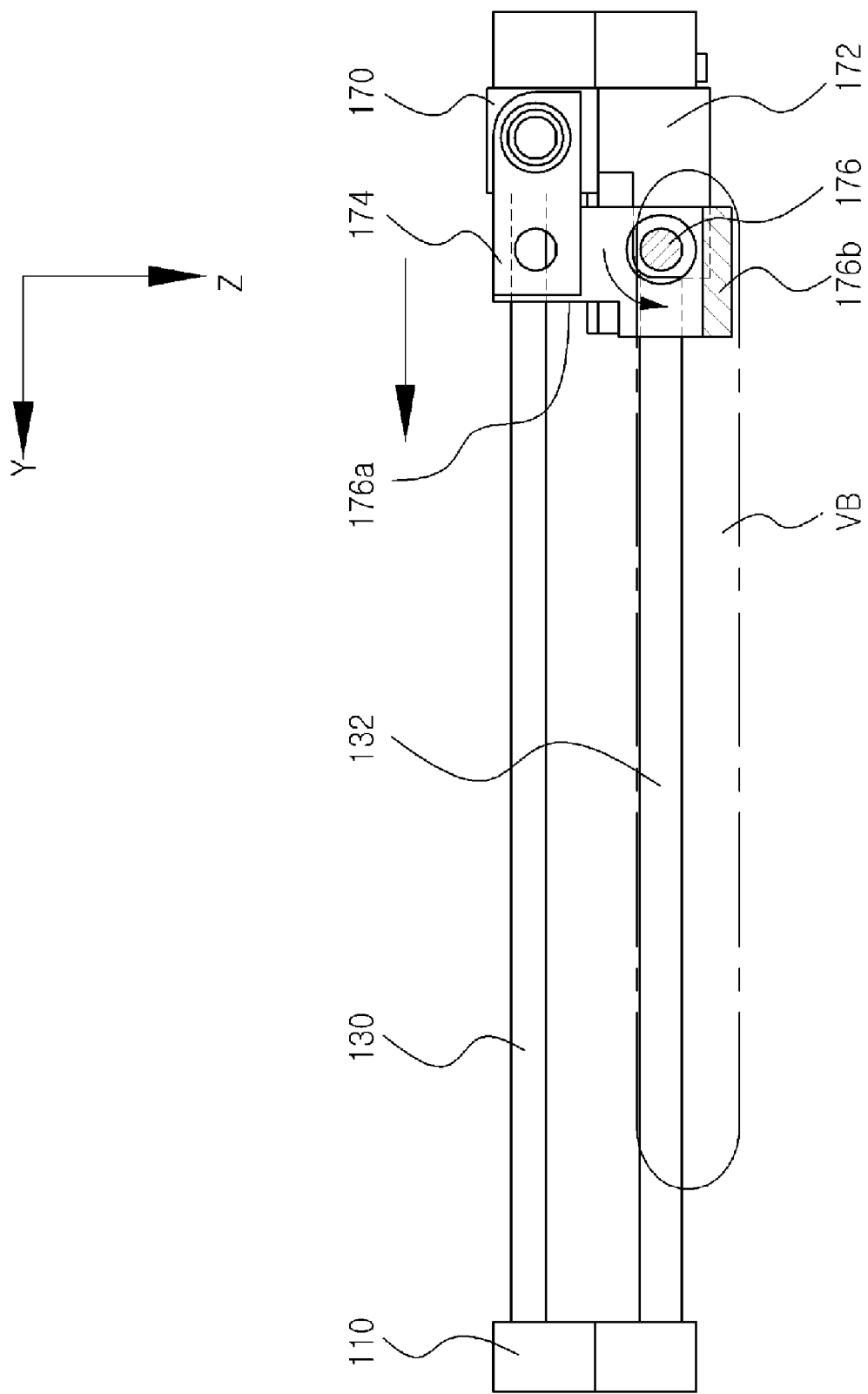

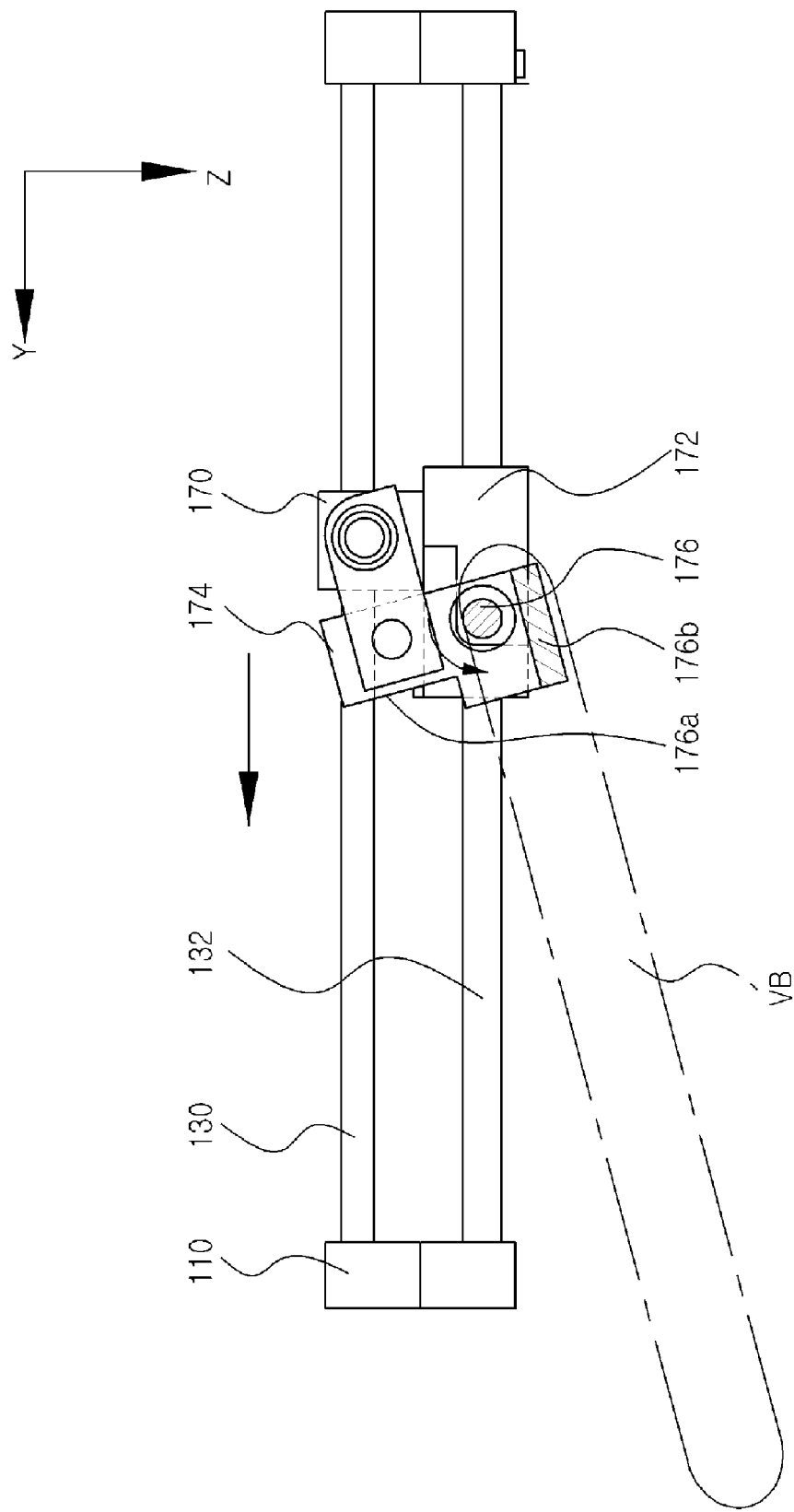
[Fig. 8]

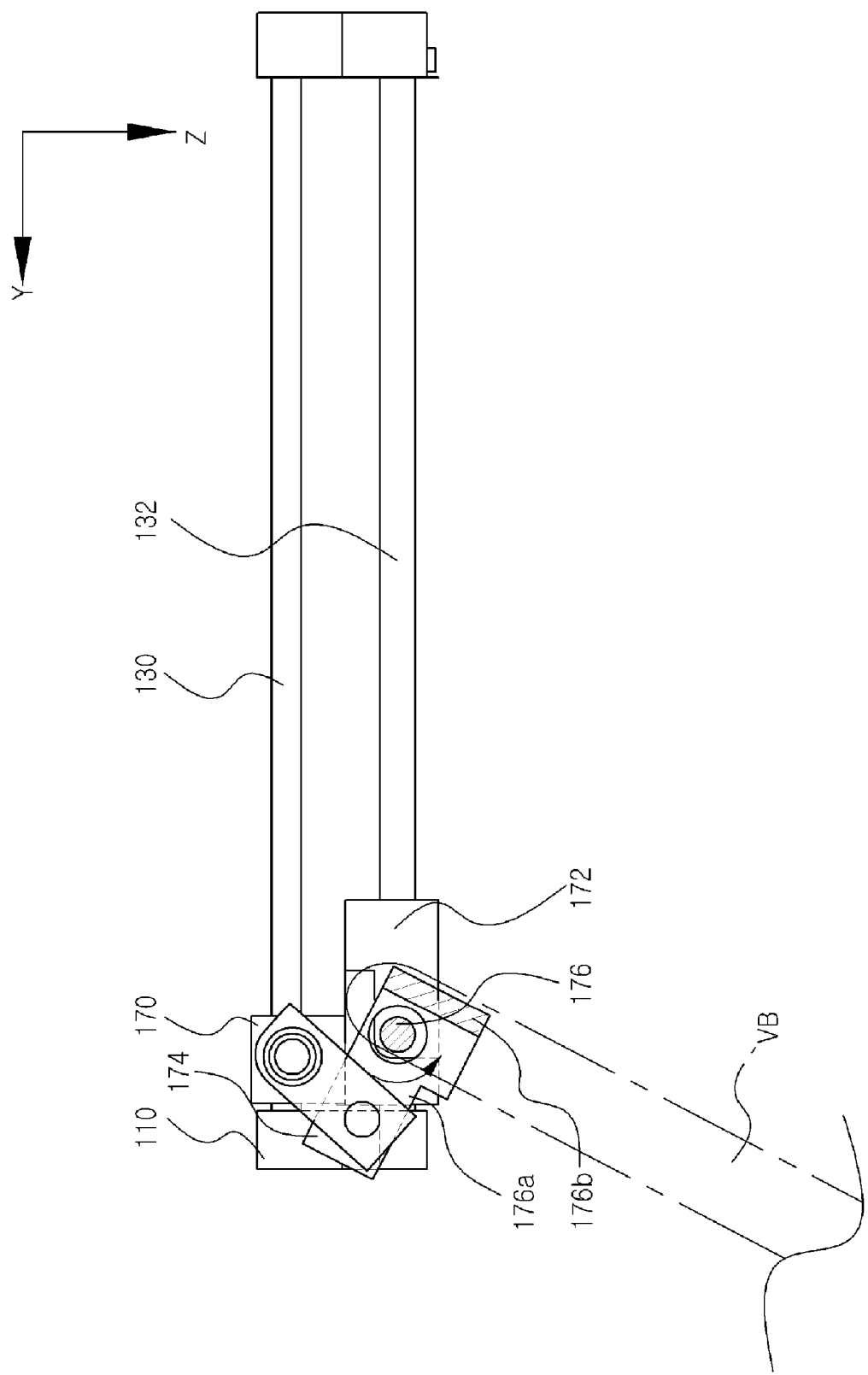
[Fig. 9]

[Fig. 10]
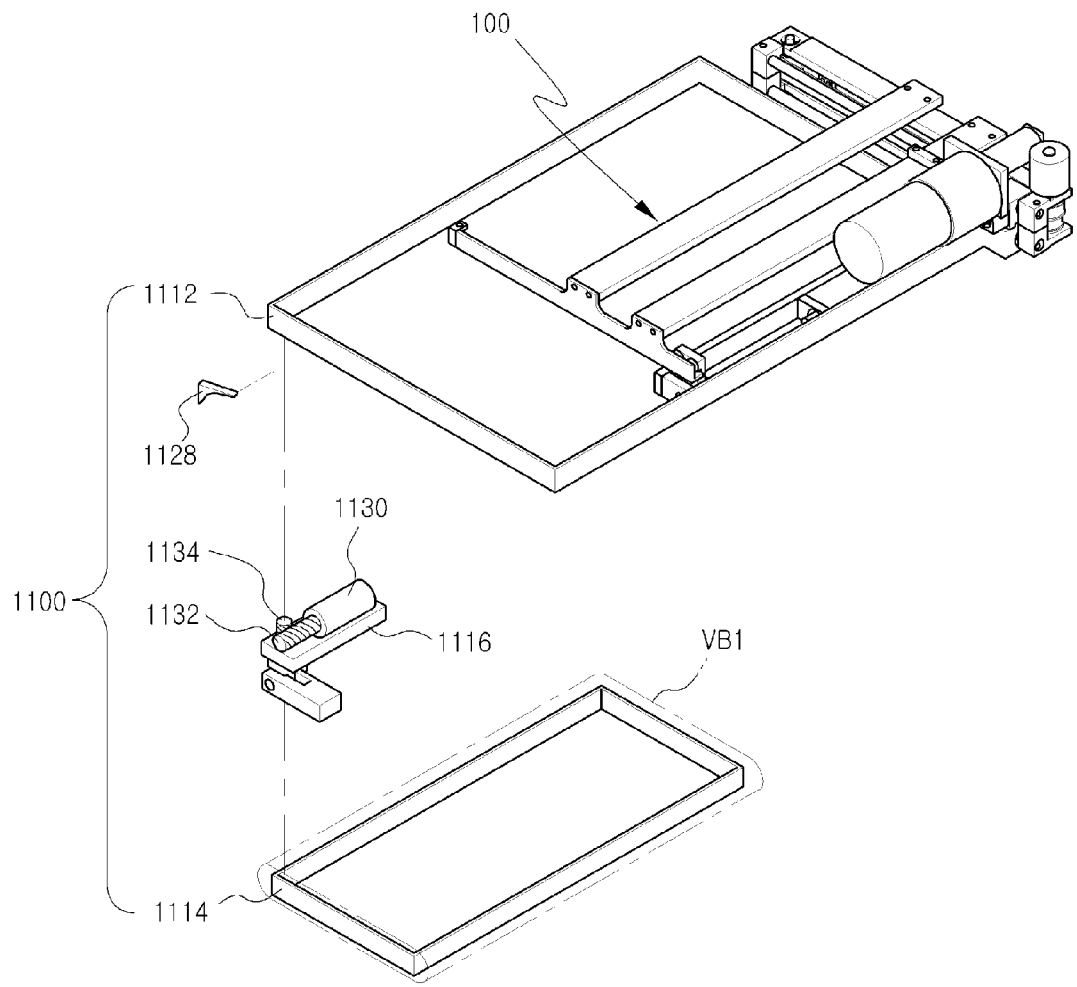
[Fig. 11]
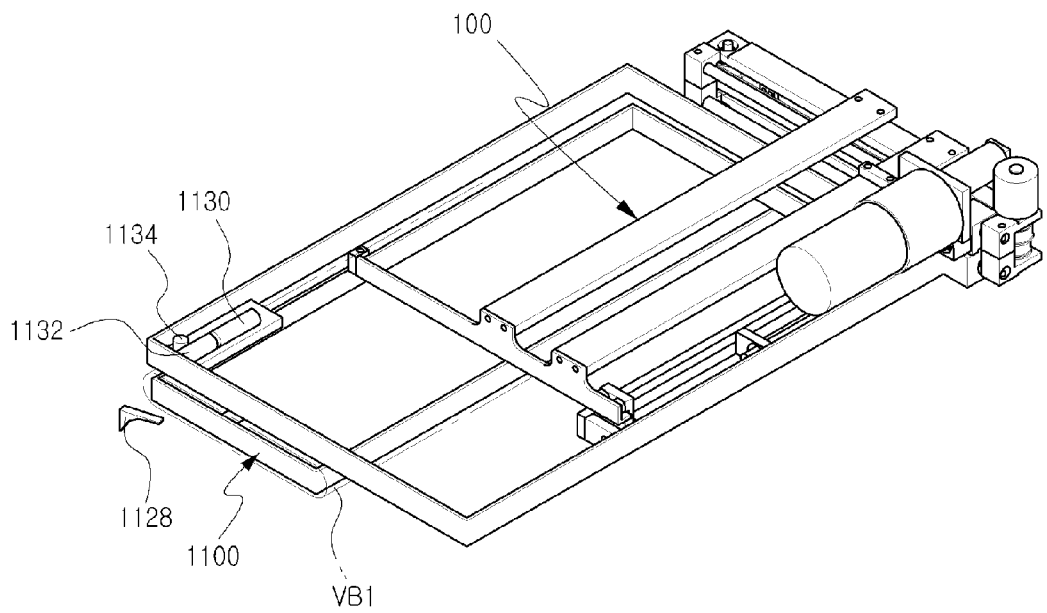

[Fig. 12]
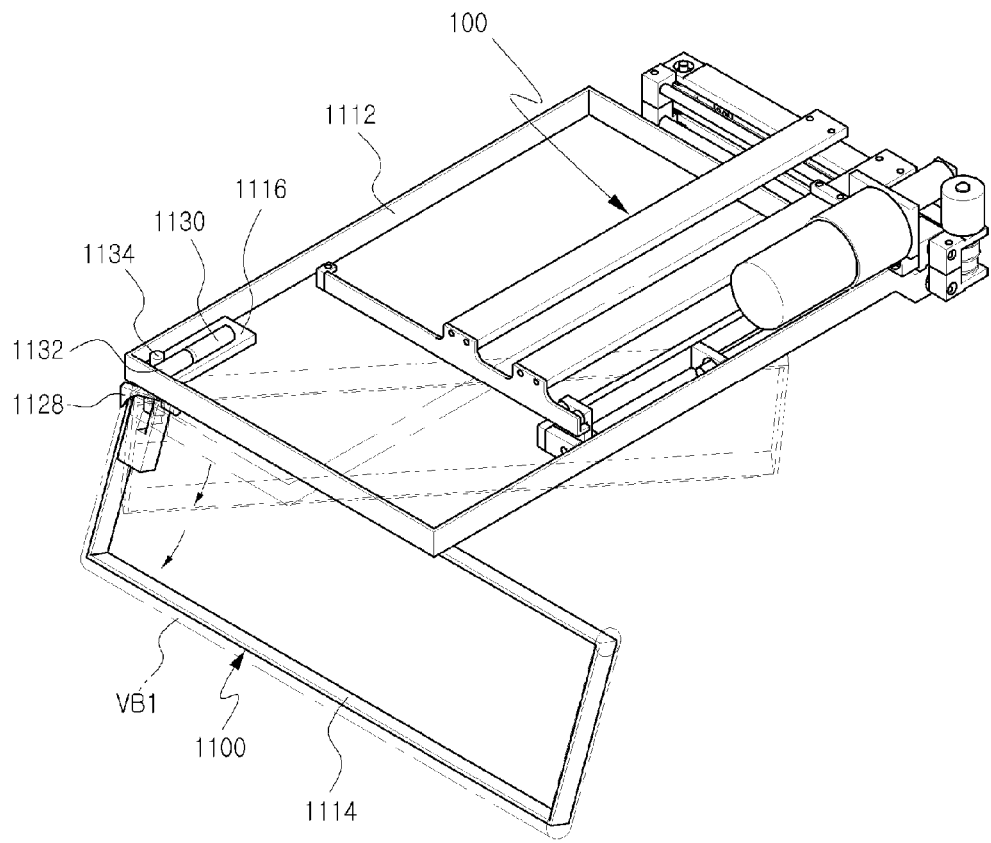
[Fig. 13]
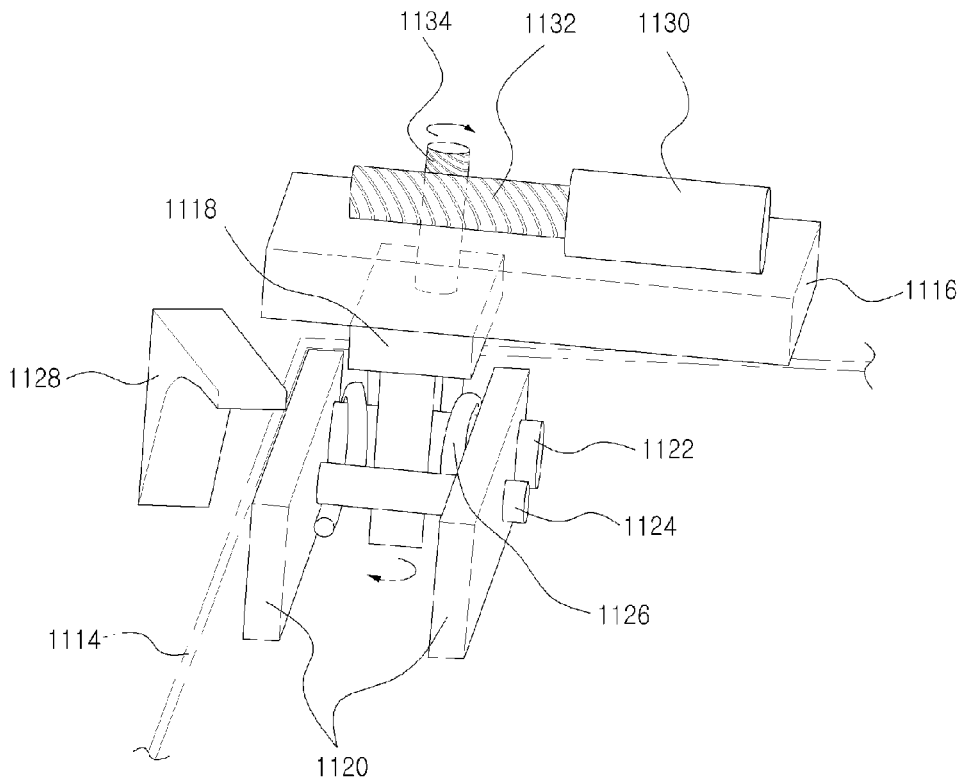

[Fig. 14]
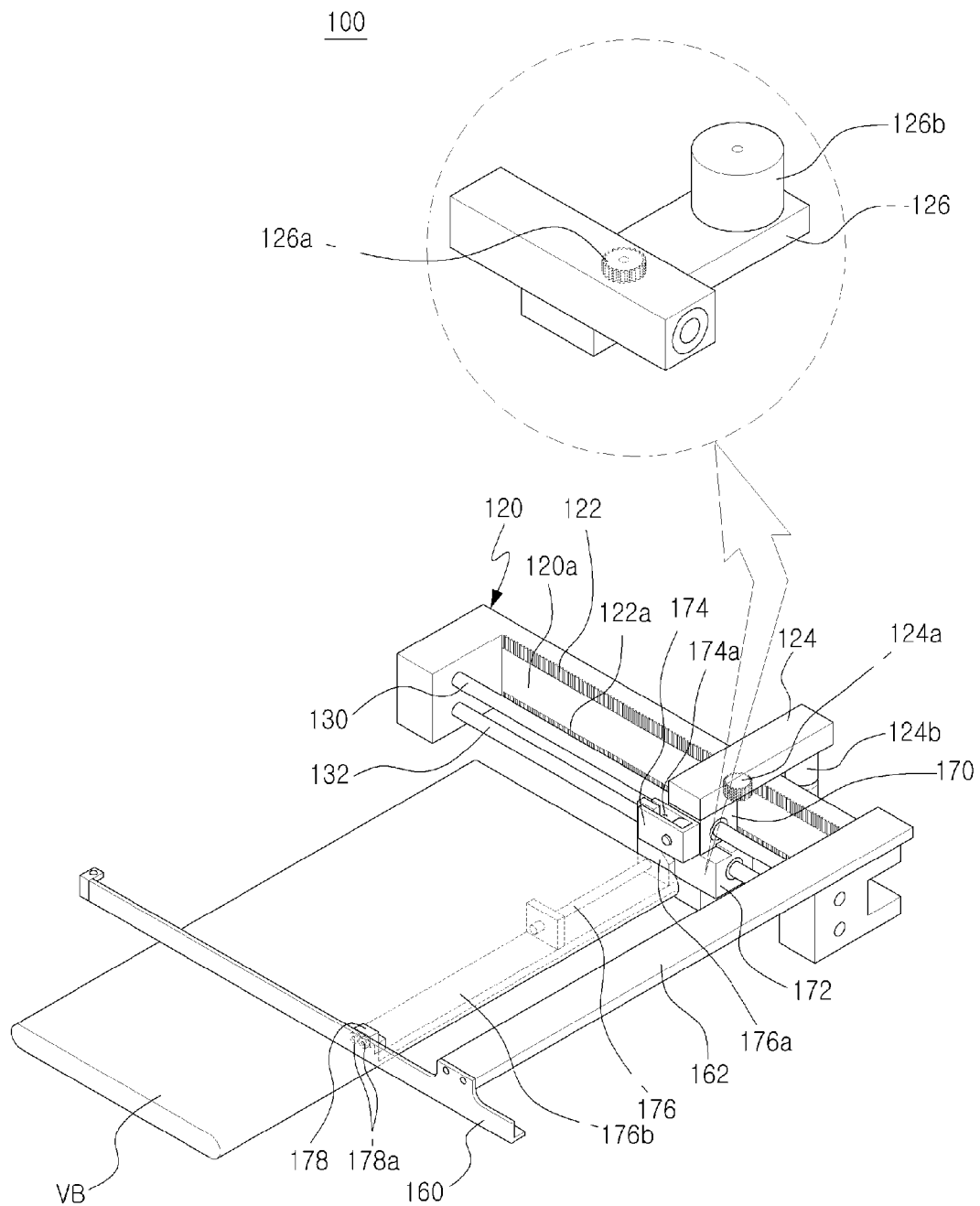

[Fig. 15]
100
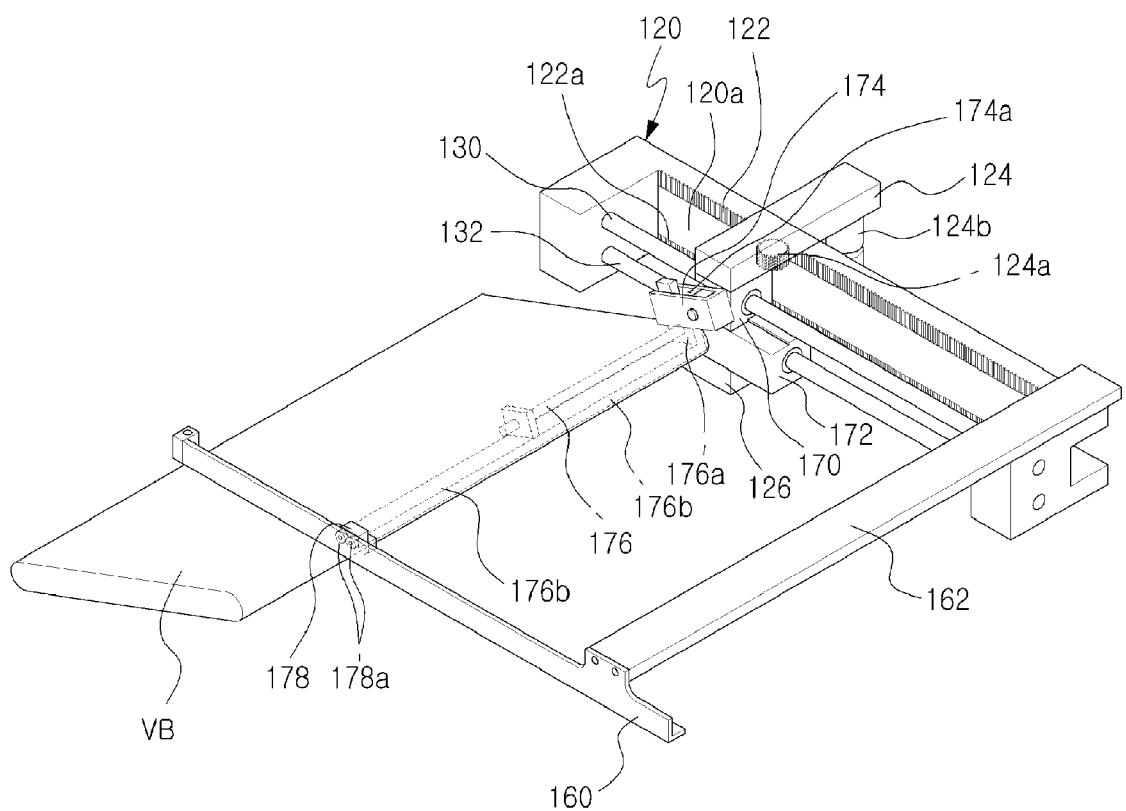

[Fig. 16]
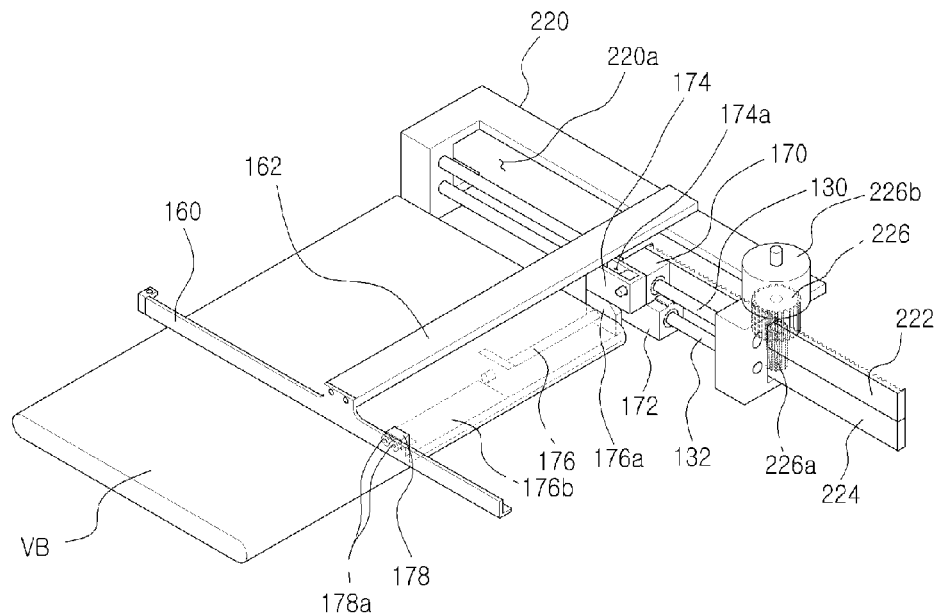
[Fig. 17]
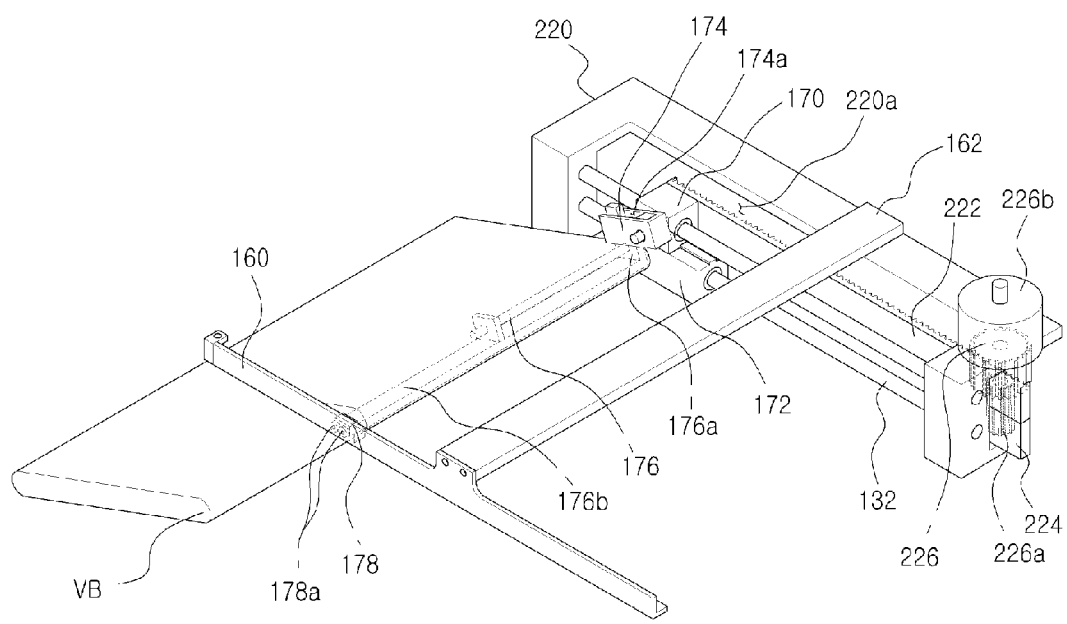

[Fig. 18]
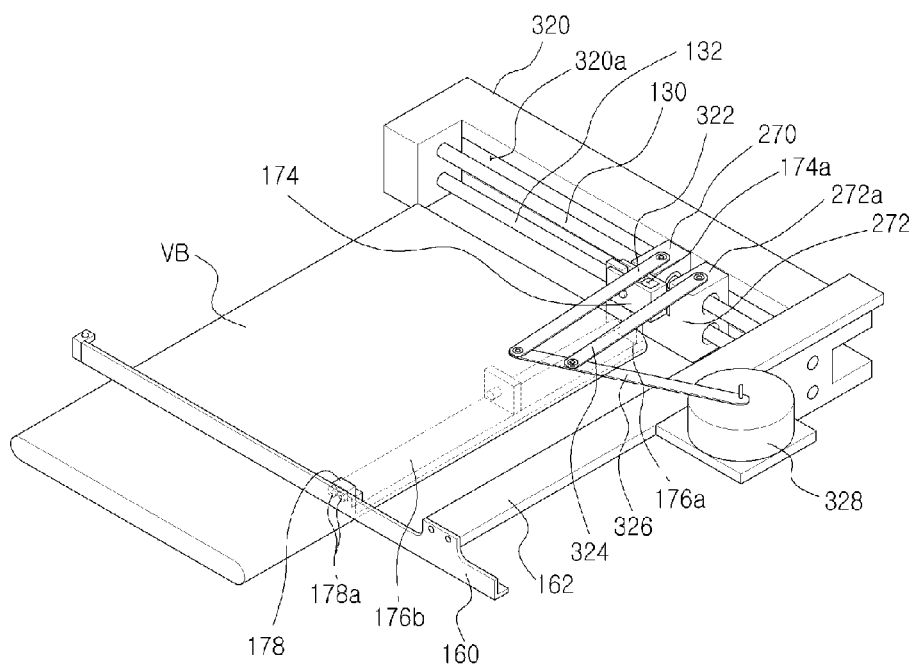
[Fig. 19]
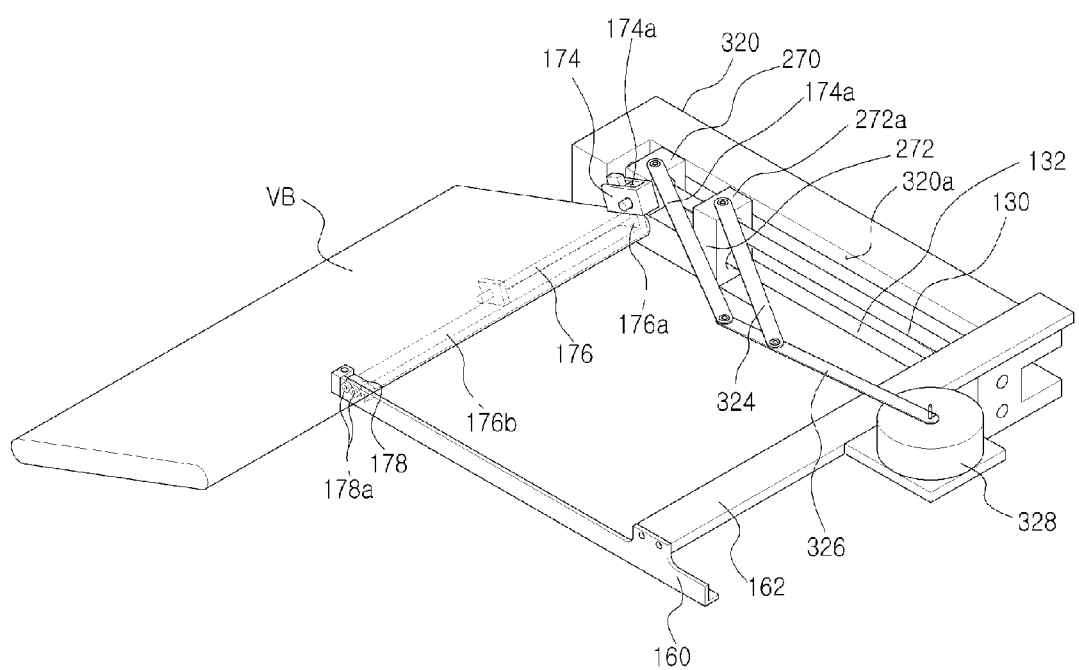

[Fig. 20]
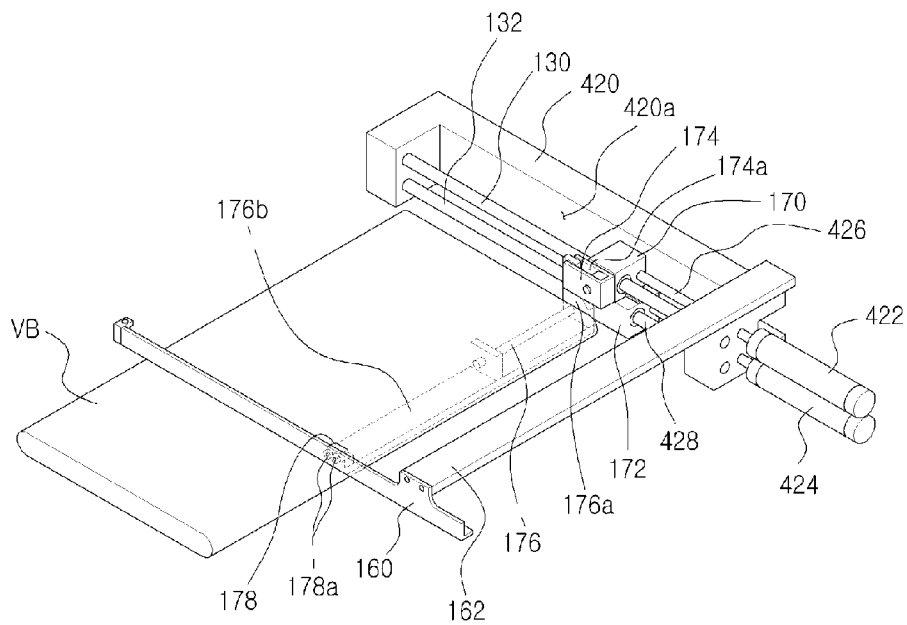
[Fig. 21]
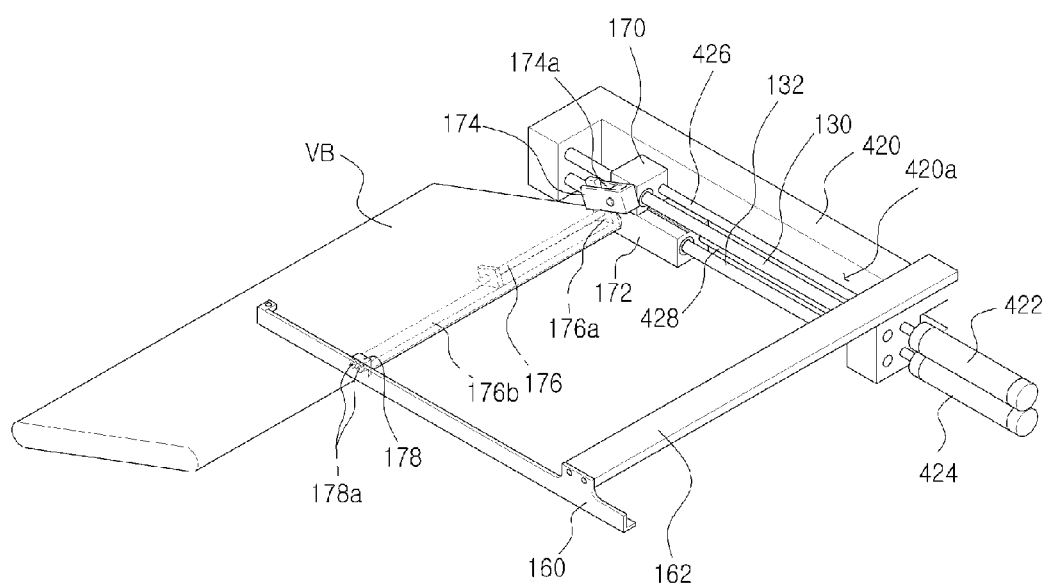

[Fig. 22]
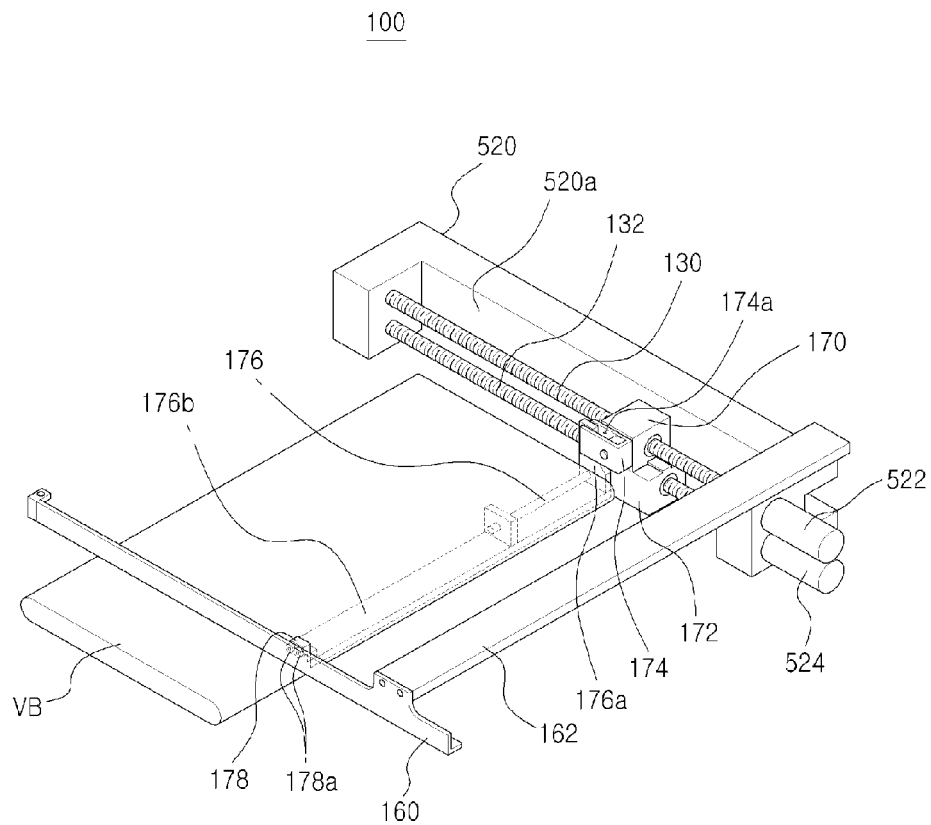
[Fig. 23]
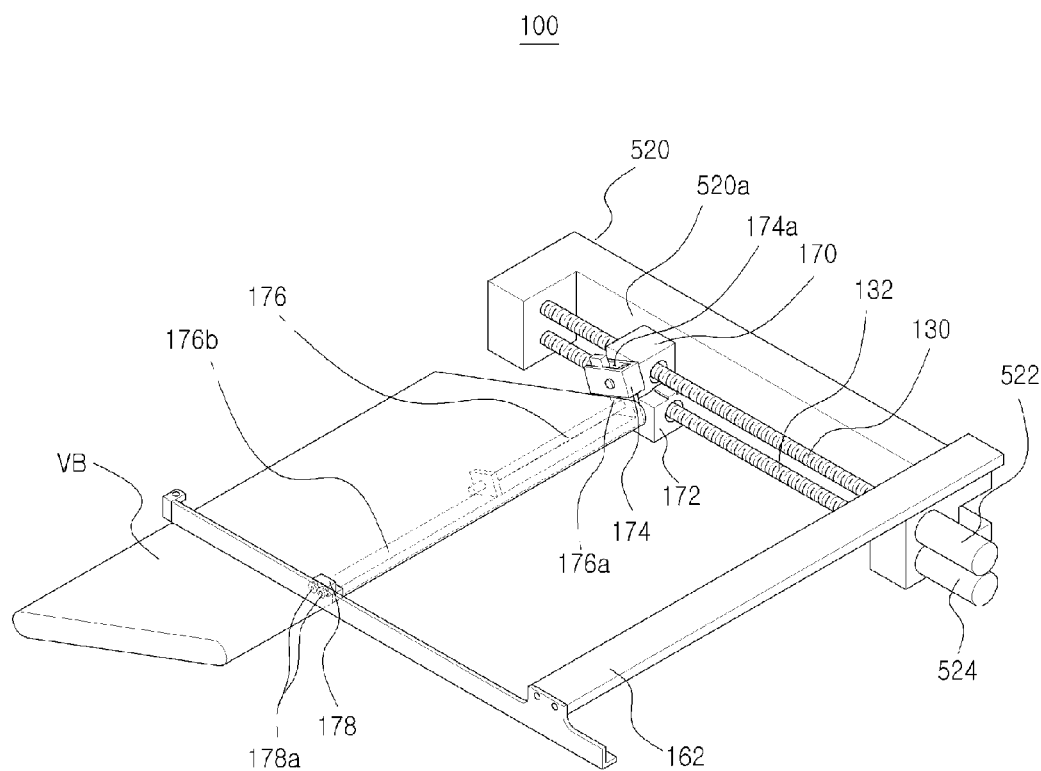

[Fig. 24]
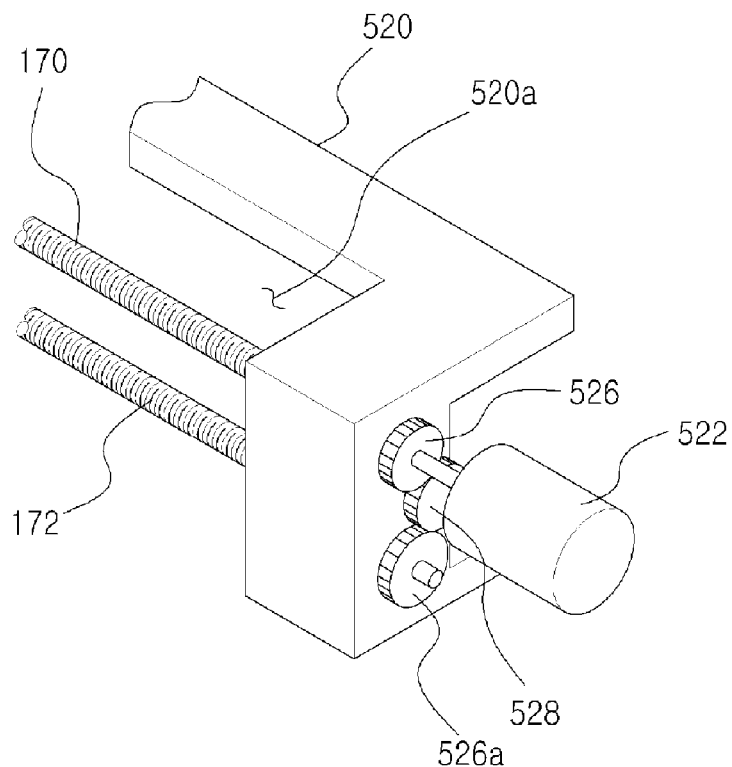
[Fig. 25]
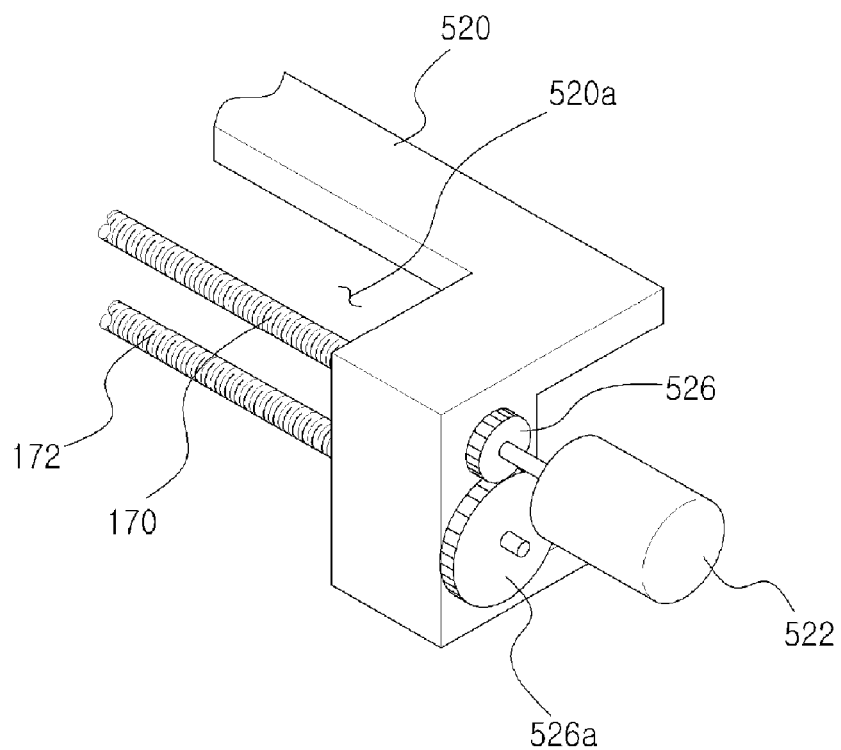

[Fig. 26]
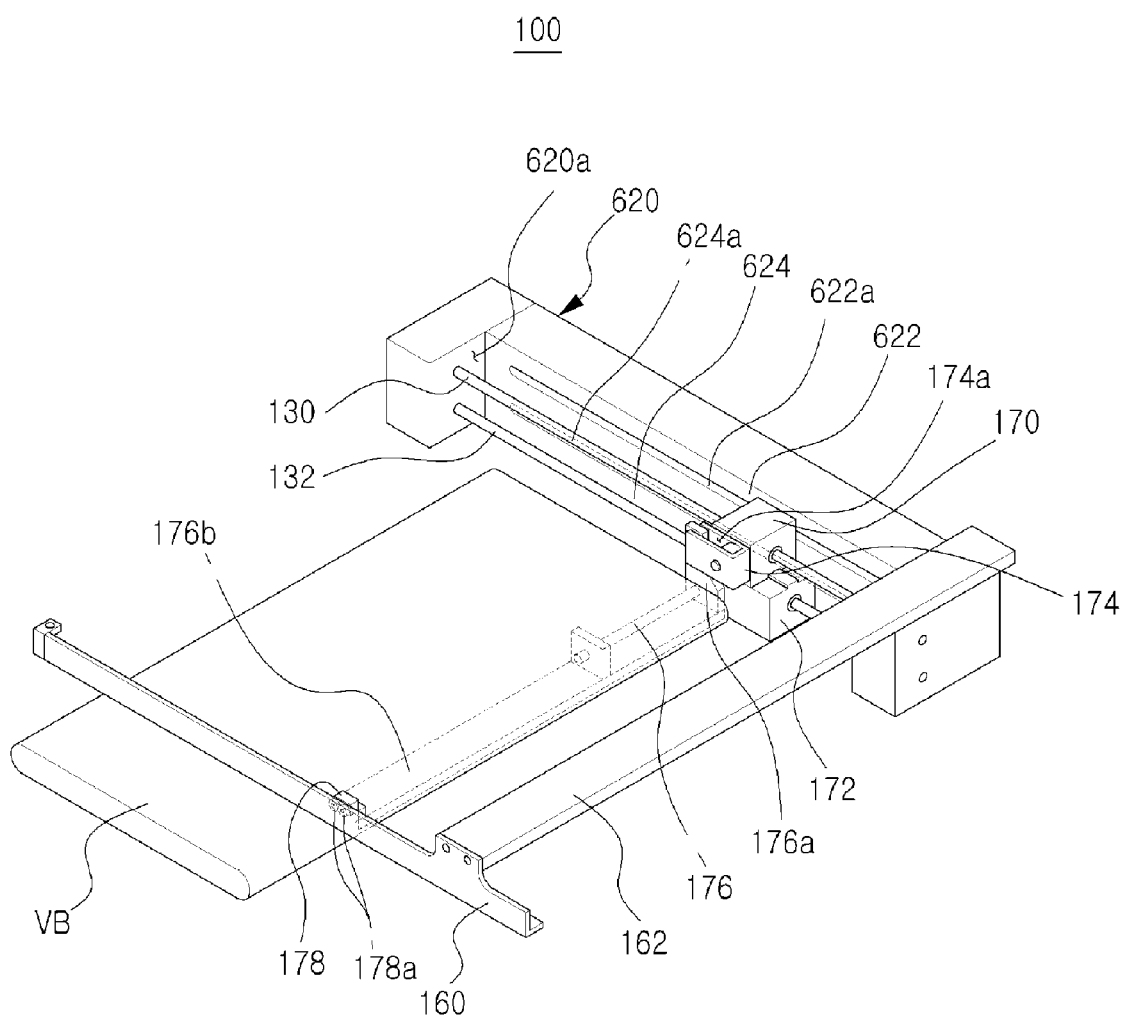

[Fig. 27]
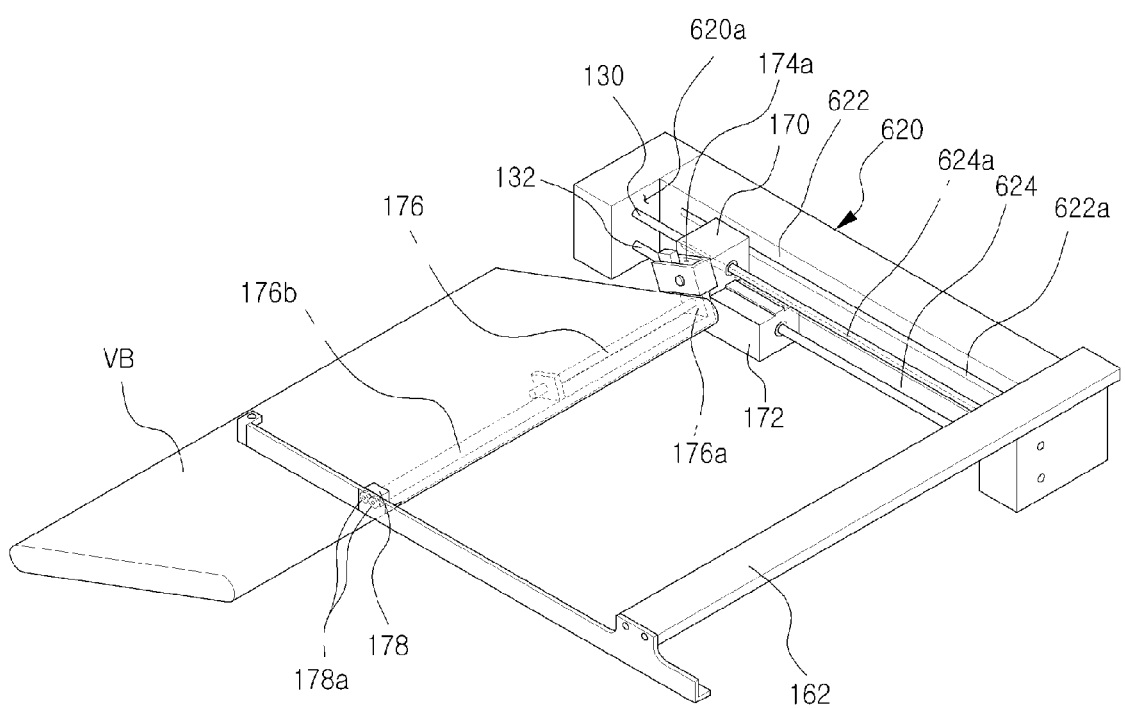

[Fig. 28]
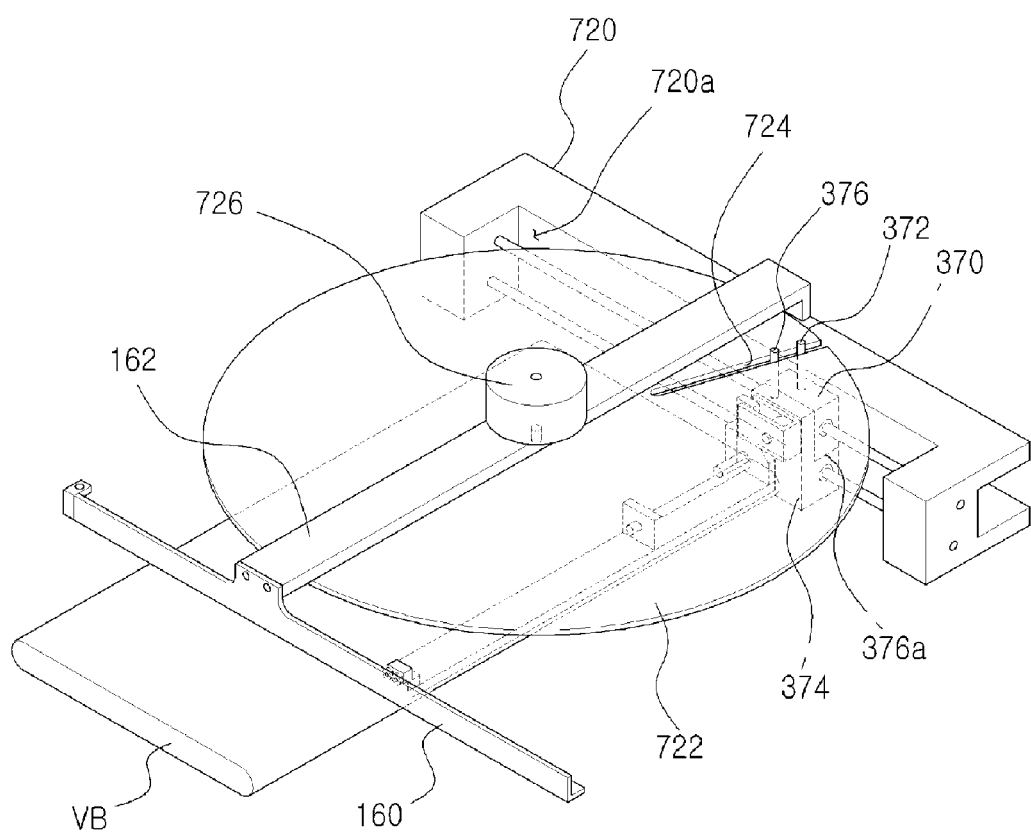

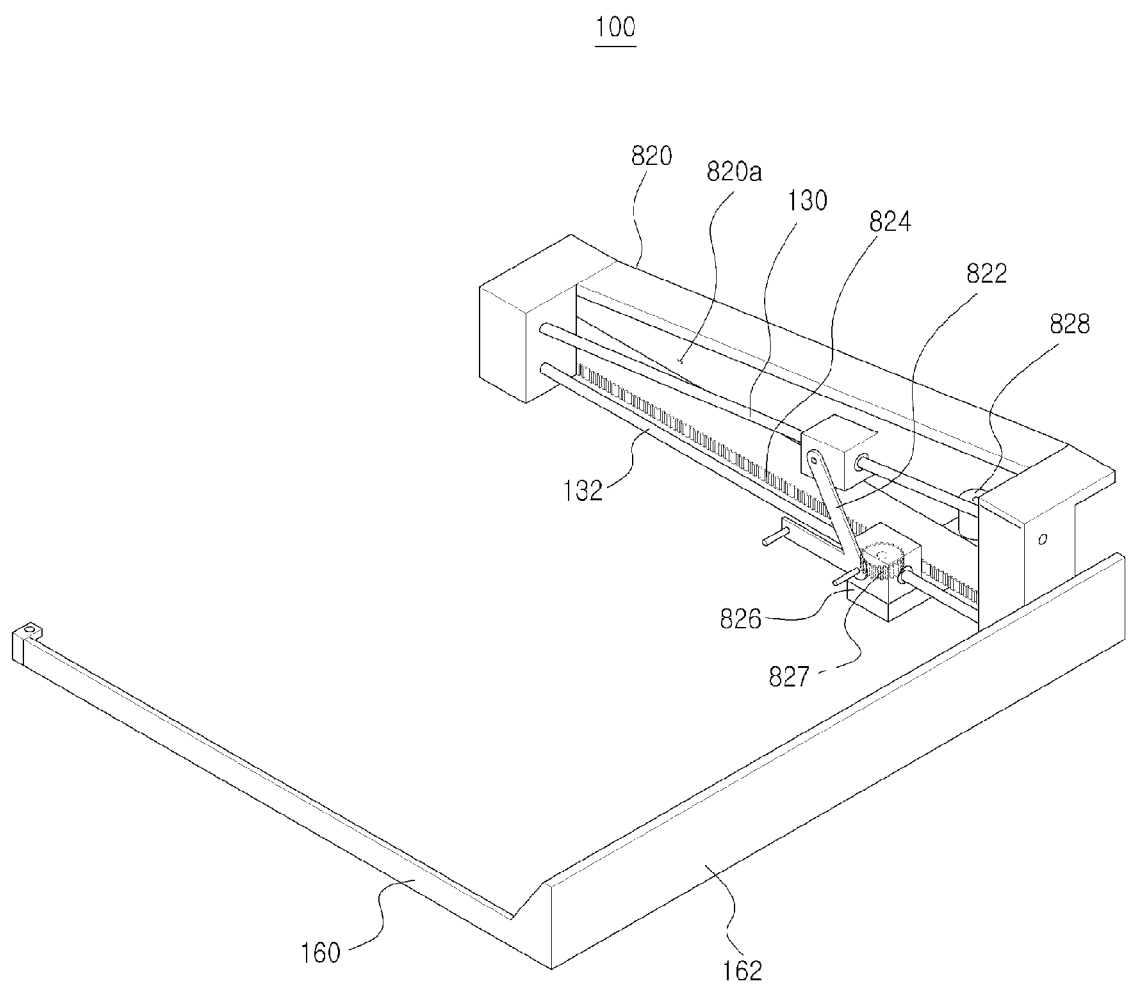
[Fig. 30]

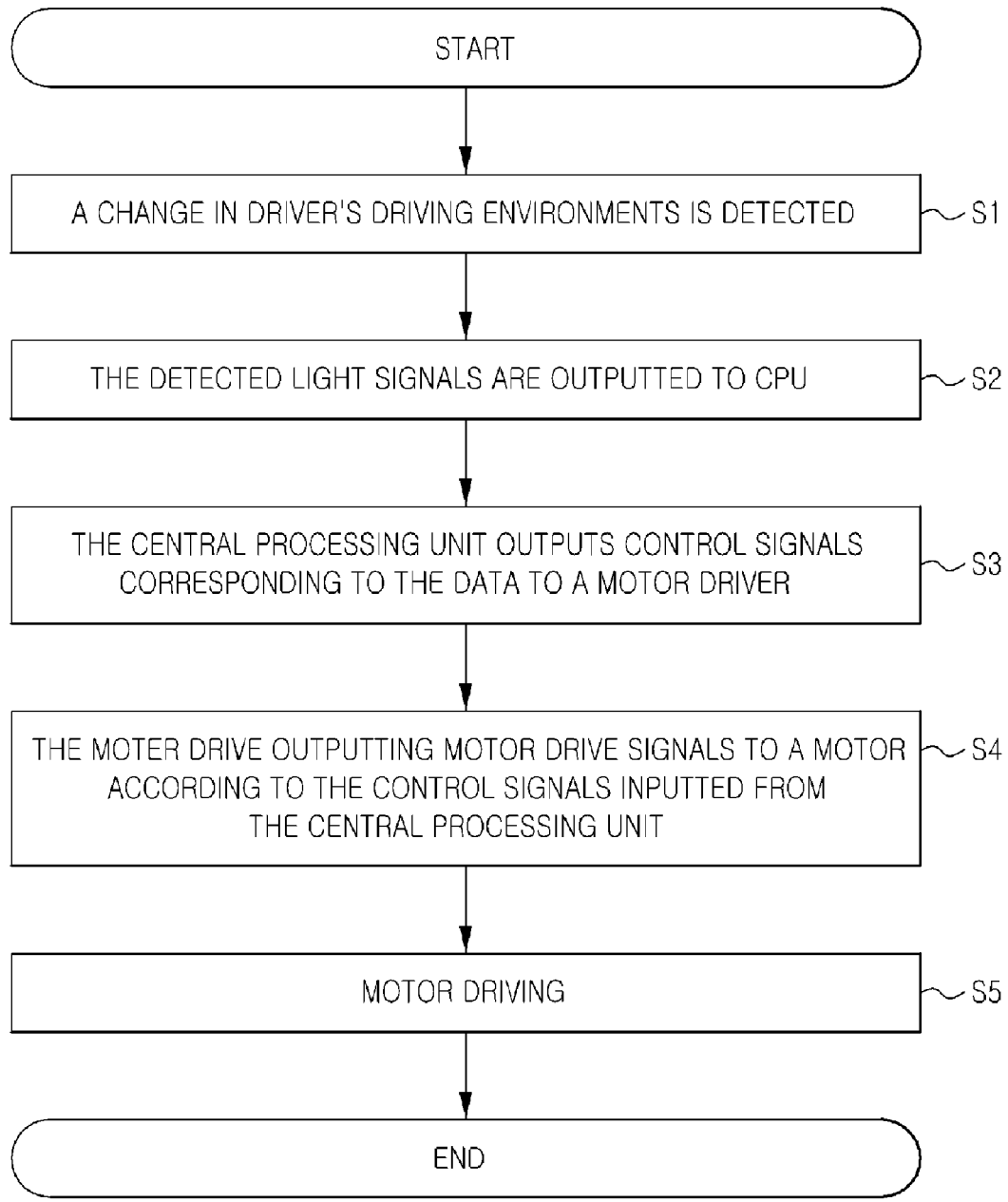
[Fig. 31]

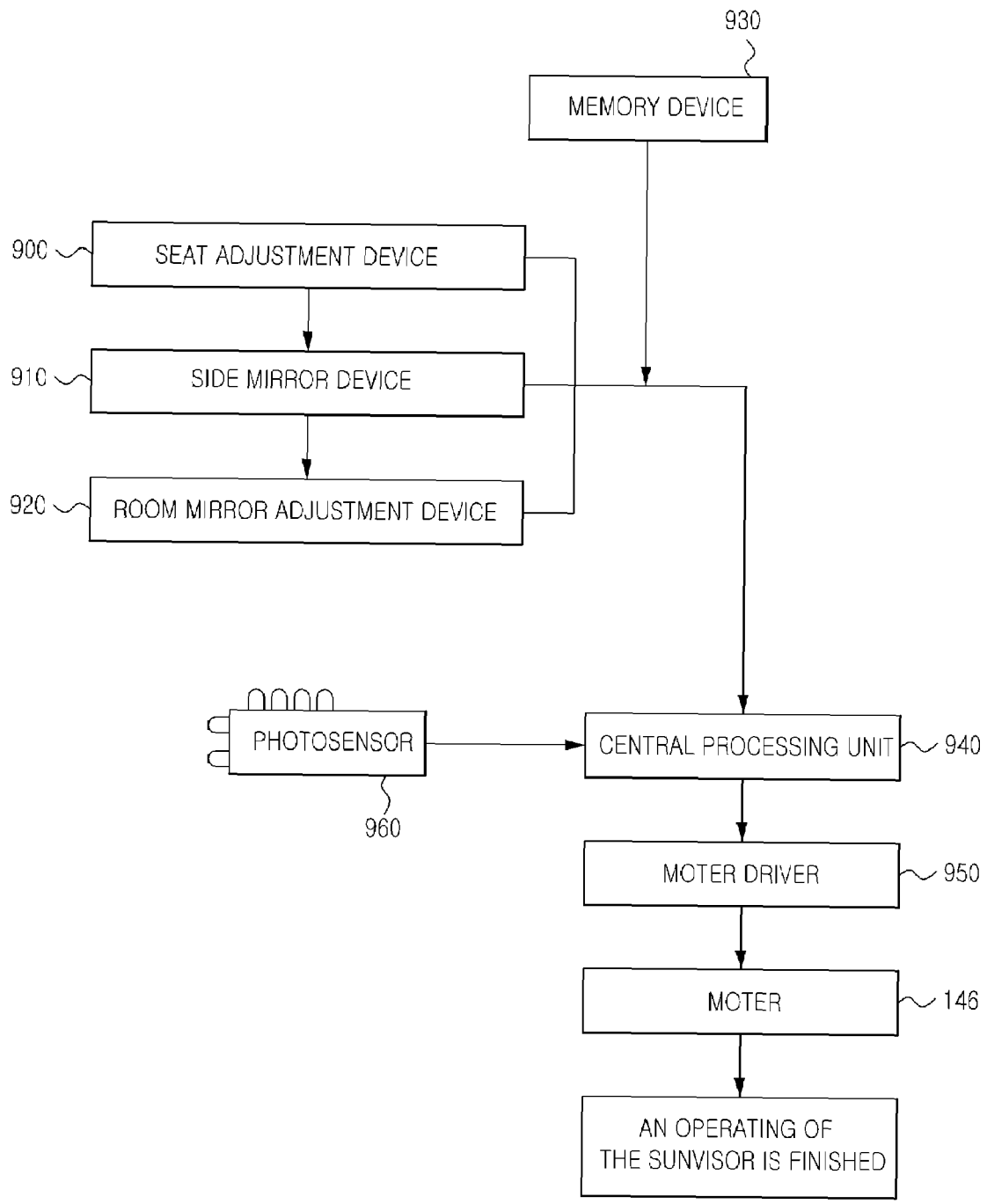
[Fig. 32]

ELECTROMOTIVE SUNVISOR ASSEMBLY OF A VEHICLE AND THE METHOD THEREOF

RELATED APPLICATIONS

This application is a 35 U.S.C. 371 national stage filing of International Application No. PCT/KR2005/000832, filed Mar. 22, 2005 which claims priority to Korean Patent Application No. 2004-33141. The contents of the aforementioned application are hereby incorporated by reference.

TECHNICAL FIELD

The present invention relates to an electromotive sunvisor assembly for vehicles and the like, and more particularly to an improved electromotive sunvisor assembly for vehicles wherein a visor body horizontally, which is received in an enclosure, i.e., in a receiving room, horizontally moves forward to a shielding position and at the same time rotates continuously in an inclined direction of a head liner and a windshield to control an angle of the visor body, and an auxiliary visor body is moved to a direction of a side window to shield light.

BACKGROUND ART

Most sunvisors are mounted to a headliner at the upper front of a driver's seat and a passenger seat. A sunvisor is pivotable downward to shield light projected to a front windshield position. In addition, the sunvisor shifts to a side window to shield light projected to the side window.

U.S. Pat. No. 5,031,952, to Miyamoto et al, issued Jul. 16, 1991, discloses a sunvisor device for vehicles and the like as one example of a conventional sunvisor assembly which is actuated by electric power. The sunvisor device is constituted so as to automatically move from a concealment position received within an enclosure formed between a vehicle roof and a headliner to a shielding position. Such con-ventional electromotive sunvisor assembly has an effect of driving a visor body without using hands, but has a problem that a horizontal movement from the concealment position received within the enclosure to the shielding position is first made, and then the sunvisor is completely pivoted in a downward direction of the visor body at the shielding position, so that the sunvisor cannot be adjusted at an angle as much as a driver wishes. In addition, this pivotal movement may interrupt the driver's view. Furthermore, the conventional sunvisor cannot protect passengers from bright sunlight or light sources emitting bright light incoming from a direction of side windows.

DISCLOSURE OF INVENTION

Technical Problem

To solve the foregoing problems experienced with the conventional technique, it is an object of the present invention to provide an electromotive sunvisor assembly for vehicles, which moves an enclosure, i.e., a visor body which is horizontally received within a receiving room, horizontally forward to a shielding position and at the same time deflects the enclosure continuously along an inclined direction of a headliner and a windshield, thereby controlling a degree of a downward movement of the visor body without interrupting a driver's front view.

It is another object of the present invention to provide an electromotive sunvisor assembly for vehicles which can shield bright sunlight, which is delivered to passengers through side windows as well as a windshield, or light sources such as headlights of oncoming vehicles.

It is yet another object of the present invention to provide a method for controlling the electromotive sunvisor assembly according to driving environments of a driver.

Technical Solution

To achieve these objects, the present invention provides an electromotive sunvisor assembly for vehicles, which is installed within in a receiving room between a roof panel and a headliner to shield lights projected into a vehicle by a visor body, comprising:

first guide means and second guide means which are disposed in parallel to each other;

first movement means which is glidingly disposed at the first guide means;

second movement means which is glidingly disposed at the second guide means;

a rotary center shaft which extends horizontally from the second movement means;

a mounting bar which is rotatably installed at the rotary center shaft and on which the visor body is fixed;

a rotation strip which is protrudingly formed on the mounting bar so as to be deflected from the rotary center shaft;

a connecting link, one end of which is axially bonded with one side of the first movement means and the other end of which is rotatably axially bonded with the rotation strip; and velocity differential generation means for generating a velocity differential when the first movement means and the second movement means glide along the first guide means and the second guide means while maintaining the connection state of the mounting bar, the rotation strip and the connecting link.

The present invention provides a method for controlling an electromotive sunvisor assembly for vehicles comprising:

a sensor detecting degrees of variations in the driving environments of a driver;

the sensor generating the resultant variation data and ouputting the data to a central processing unit;

the central processing unit generating control signals corresponding to each data inputted from the sensor and outputting the control signals to a motor drive;

the motor drive outputting motor drive signals to a motor according to the control signals inputted from the central processing unit; and the motor being actuated according to the motor drive signals.

Advantageous Effects

As described above, according to the electromotive sunvisor assembly for vehicles and the method for controlling the same according to one embodiment of the present invention, the visor body, which is horizontally received within the enclosure, i.e., the receiving room, horizontally moves forward to the shielding position and, at the same time, deflects continuously along the inclined direction of the headliner and the windshield, thereby controlling a degree of downward movement of the visor body without interrupting a driver's front view.

In addition, the electromotive sunvisor assembly for vehicles of the present invention can shield bright sunlight projected on passengers through side windows as well as a windshield or light sources such as headlights of oncoming vehicles.

Further, the present invention can control the above-described electromotive sunvisor assembly according to variations in the driving environments of a driver.

BRIEF DESCRIPTION OF THE DRAWINGS

FIG. 1 is a perspective view showing the installation state of an electromotive sunvisor assembly for vehicles according to a preferred embodiment of the present invention;

FIG. 2 is an exploded perspective view of FIG. 1;

FIG. 3 is an exploded perspective view of the sunvisor assembly of FIG. 1;

FIG. 4 is a sectional view showing the state before the operation of a visor body taken along line A-A of FIG. 1;

FIG. 5 is a sectional view showing the state after the operation of the visor body taken along line A-A of FIG. 1;

FIG. 6 is a sectional view taken along line B-B of FIG. 1;

FIG. 7 is a view showing the visor body at the initial position seen in the direction of the arrow C of FIG. 2;

FIG. 8 is a view showing the visor body at the midway position seen in the direction of the arrow C of FIG. 2;

FIG. 9 is a view showing the visor body at the final position seen in the direction of the arrow C of FIG. 2;

FIG. 10 is a perspective view of the sunvisor assembly on which an auxiliary sunvisor is mounted in FIG. 3;

FIG. 11 is a perspective view of the in-use state of the auxiliary sunvisor in FIG. 7;

FIG. 12 is a perspective view of a side driving device of the auxiliary sunvisor in FIG. 7;

FIG. 13 is an enlarged scale perspective view of a first mounting plate and a second mounting plate of FIG. 7;

FIG. 14 is a perspective view and a partially enlarged scale view of an electromotive sunvisor assembly for vehicles according to a second embodiment of the present invention;

FIG. 15 is a view showing the state in which the visor body has moved forward in FIG. 14;

FIG. 16 is a perspective view of an electromotive sunvisor assembly according to a third embodiment of the present invention;

FIG. 17 is a view showing the state in which the visor body has moves forward in FIG. 16;

FIG. 18 is a perspective view of an electromotive sunvisor assembly according to a fourth embodiment of the present invention;

FIG. 19 is a view showing the state in which the visor body has moved forward in FIG. 18;

FIG. 20 is a perspective view of an electromotive sunvisor assembly according to a fifth embodiment of the present invention;

FIG. 21 is a view showing the state in which the visor body has moved forward in FIG. 20;

FIG. 22 is a perspective view of an electromotive sunvisor assembly according to a sixth embodiment of the present invention;

FIG. 23 is a view showing the state in which the visor body has moved forward in FIG. 22;

FIG. 24 is a view showing a variation of FIG. 22;

FIG. 25 is a view showing another variation of FIG. 22;

FIG. 26 is a perspective view of an electromotive sunvisor assembly for vehicles according to a seventh embodiment of the present invention;

FIG. 27 is a view showing the state in which the visor body has moved forward in FIG. 26;

FIG. 28 is a perspective view of an electromotive sunvisor assembly for vehicles according to an eighth embodiment of the present invention;

FIG. 30 is a perspective view of an electromotive sunvisor assembly for vehicles according to a ninth embodiment of the present invention;

FIG. 31 is a block diagram showing the method for controlling the electromotive sunvisor assembly for vehicles according the preferred embodiment of the present invention; and FIG. 32 is a flow chart of FIG. 31.

Figure 29:
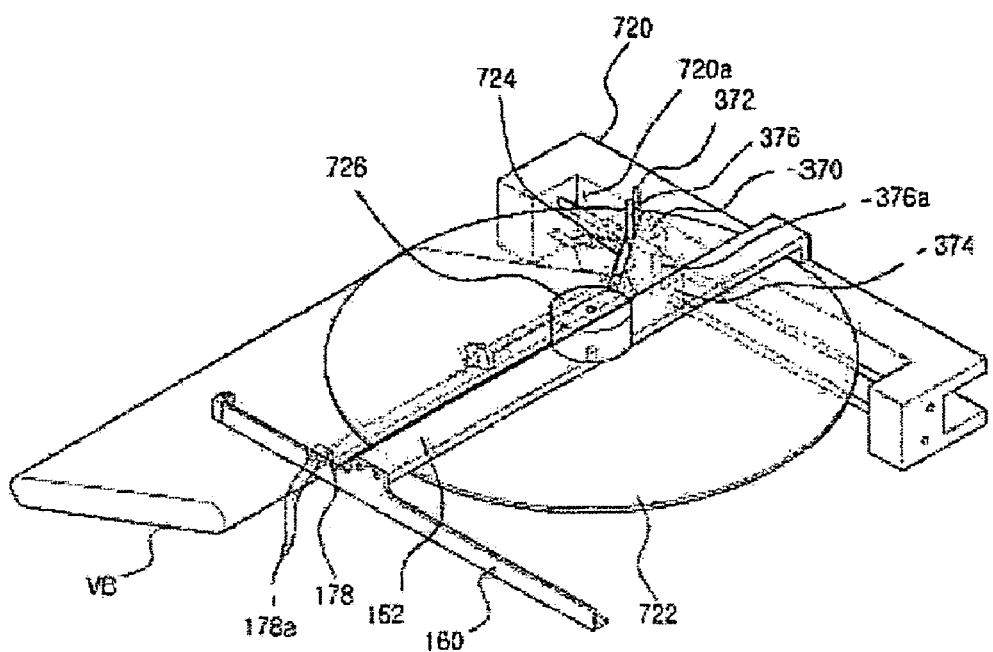
FIG. 29 is a view showing the state in which the visor body has moved forward in FIG. 28.

Corresponding reference characters indicate corresponding parts throughout the several views. Although the drawings represent embodiments of the invention, the drawings are not necessarily to scale and certain features may be exaggerated or omitted in order to better illustrate and explain the present invention

BEST MODE FOR CARRYING OUT THE INVENTION

The advantages and objects of this invention and the manner of achieving them, will become more apparent and the invention itself will be better understood by reference to the following description of embodiments of the invention taken in conjunction with the accompanying drawings.

FIGS. 1-5 are views of a vehicle (10) incorporating a sunvisor assembly (100) of a preferred embodiment of the present invention.

As illustrated in FIGS. 1-5, the vehicle includes a roof structure (12). A windshield (14) is obliquely installed at the front end of the roof structure (12). A side window (not shown) is installed perpendicularly (Z direction) at the side end of the roof structure (12). A front frame (18) is horizontally (X direction) on the front bottom surface of the roof structure (12). A middle frame (20) is installed longitudinally (Y direction) on the front bottom surface of the roof structure (12) in such a way that one end of the middle frame (20) contacts the front frame (18). A headliner (22) is installed inside the roof structure (12) so as to define a receiving room (24) within which the sunvisor assembly (100) is received.

In the electromotive sunvisor assembly (100) of the present invention, the elements excluding a visor body (VB) are installed in the receiving room (24) formed between the roof structure (12) and the headliner (22). Of course, the visor body (VB) may be received within the receiving room (24) according to a structure of a vehicle.

FIG. 3 illustrates an exploded view of the sunvisor assembly (100) of FIG. 1, FIG. 4 is a sectional view taken along line A-A of FIG. 1, and FIG. 6 is a sectional view taken along line B-B of FIG. 1.

As shown in this embodiment, the sunvisor assembly (100) includes a main body (110). The main body (110) includes an upper body (112) and a lower body (114). The upper body (112) is provided with upper axis holes (112a) at both ends. The lower body (114) is provided with lower axis holes (114a) at both ends. Spacing maintenance elements (116) are disposed at the front of both ends of the upper body (112) and the lower body (114) to be combined. Between the spacing maintenance elements, there are provided an upper guide rod (130) as a first guide means and a lower guide rod (132) as a second guide means. The upper guide rod (130) and the lower guide rod (132) are disposed in parallel to each other.

The velocity differential generation means will be explained in detail below.

A pair of first pulleys (140) and a pair of second pulleys (140a) are installed at the rotation axes (142) installed at both ends of the upper body (112) and the lower body (114). The first pulleys (140) are located above the second pulleys (140a). A first belt (144) is coupled between the first pulleys (140), and a second belt (144a) is coupled between the second pulleys (140a). Here, it is preferable that the diameter of the first pulleys (140) is formed larger than that of the second pulleys (140a). This is to make a travel speed of the first belt (144) faster than that of the second belt (144a) even when the first pulleys (140) and the second pulleys (140a) rotate at the same speed.

A drive gear (146b) is connected to the principal axis (146a) of the motor (146). A connecting axis (148) is connected to one of the rotation axes (142) exposed to one end of the upper body (112). The drive gear (146b) is engaged with a slave gear (148a) of a bevel or helical type to transmit the rotational force of the motor (146) to the first and second pulleys (140, 140a) through the connecting axis (148) and the rotation axis (142). This configuration is to increase the efficiency, and if a spatial restriction is not large, the rotational force of the motor (146) may be applied directly to the connecting axis (148) or the rotation axis (142).

An upper travel member (170) is installed as a first movement means at one side of the first belt (144), and a lower travel member (172) is installed as a second movement means at one side of the second belt (144a). A fixed end of a connection link (174) is axially connected rotatably to one side of the upper travel member (170). An operation recess (174a) is formed at the free end of the connection link (174). A rotary center shaft (176) protrudes at one side of the lower travel member (172). A mounting bar (176b) of the visor body (VB) is axially connected rotatably to the rotary center shaft (176), and is protrudingly formed so as to be deflected from the center of the rotary center shaft (176). One end of a rotation strip (176a) is connected to the connection link (174). As such, the link connection between the upper travel member (170) and the lower travel member (172) is made. Here, the visor body (VB) is fixed with the mounting bar (176b) enclosed.

Preferably, a guide rail (160) may be installed to support the opposite side of the main body (110), and the guide rail (160) is spaced at a predetermined interval from the upper body (112) and the lower body (114) so that the upper and lower bodies (112, 114) may be parallel with each other. At least one connection bar (162) may be installed between the guide rail (160) and the upper body. A roller installation strip (178) is axially connected rotatably to the free end of the mounting bar (176b) connected rotatably to the rotary center shaft (176). At least one guide roller (178a) is axially connected to the roller installation strip (178). The guide roller (178a) moves along the top surface of the guide rail (160).

The operation of the electromotive sunvisor assembly with the above-described configuration according to the preferred embodiment of the present invention will be explained with reference to the accompanying drawings below.

To begin with, when sunlight or the headlights of other vehicles is introduced into a vehicle through the front windshield (14) during driving, a driver pushes down a switch (not shown) near the driver's seat. Then, the motor (146) of the sunvisor assembly (100), the rotational force of the motor (146) is transmitted to the rotation axis (142) via the principal axis (146a), the drive gear (146b), the slave gear (148a) and the connection axis (148) in order. At the same time, the rotation axes (142) make the first belt (144) and the second belt (144a) reciprocate back and forth (Y direction) while rotating the first pulleys (140) and the second pulleys (140a).

At this process, the upper travel member (170) installed at the first belt (144) is transferred according to the travel speed of the first belt (144). Also, the lower travel member (172) installed at the second belt (144a) is transferred according to the travel speed of the second belt (144a). At this time, the upper travel member (170) glides along the upper guide rod (130), the lower travel member (172) glides along the lower guide rod (132). Here, the travel speed of the upper travel member (170) is faster than that of the lower travel member (170). This difference in the travel speed results in that the lower travel member (172) moves ahead of the upper travel member (170) in the beginning, and the upper travel member (170) travels longer than the lower travel member (172) afterwards.

As a result, the mounting bar (176) is rotated counterclockwise by the interlocking operation of the connection link (174) and the rotation strip (176a). Referring to FIGS. 7-9, the visor body (VB) is placed in a horizontal position (see FIG. 7), and then it is rotated counterclockwise by the travel operation of the upper travel member (170) (see FIG. 8) to be then placed in an oblique position (see FIG. 9). At the same time, the rotation strip (176a) is rotated on the operation recess (174a) and the rotary center shaft (176) of the lower travel member (172). Accordingly, the mounting bar (176b) is rotated counterclockwise with the connection link (174).

According to the above-described processes, the visor body (VB) is initially placed in a horizontal position in nearly contact with the headliner (22), and then it is placed in a nearly vertical position as it moves toward the front windshield (14), that is, in the Y-axis direction. More specifically, since the upper travel member (170) is located behind the lower travel member (172) in the beginning, the upper travel member (170) is placed in nearly contact with the headliner (22). Then, the upper travel member (170) is located ahead of the lower travel member (172) as the upper travel member (170) moves toward the windshield (14), that is, in the Y-axis direction. As a result, the visor body (VB) is rotated in a vertical position with respect to the headliner (22) as it moves toward the windshield (14). For reference, the driver controls the operation of the motor (146) by manipulating the button to adjust a degree of rotation of the rotation axis (142) and to consequently adjust a degree of the travel of the upper travel member (170) and the lower travel member (172), thereby controls an angle of rotation of the visor body (VB).

If it is not necessary to use the visor body (VB), the driver manipulates a return switch (not shown). The first pulleys (140) and the second pulleys (140a) are reverse-rotated by the reverse rotation of the motor (146). Then, the first belt (144) and the second belt (144a) are also reverse-rotated. Accordingly, the upper travel member (170) and the lower travel member (172) move backward along the upper guide rod (130) and the lower guide rod (132). Then, the mounting bar (176b) is rotated clockwise by the interlocking operation of the connection link (174) and the rotation strip (176a). Consequently, the visor body (VB) is placed in a nearly vertical position with respect to the headliner (22), and then is converted to a horizontal position as it moves backward.

FIG. 10 shows a sunvisor assembly (100) wherein an auxiliary visor body (VB1) is further installed in FIG. 3.

FIG. 11 shows the use state of the auxiliary visor body (VB1) in FIG. 10. FIG. 12 shows a side driving device of the auxiliary visor body (VB1) in FIG. 10. FIG. 13 shows an enlarged view of a first mounting plate and a second mounting plate in FIG. 10.

As shown in FIGS. 10-13, an auxiliary visor body (1100) may be further installed on the sunvisor assembly (100). The auxiliary visor body (1100) comprises a first frame (1112) and a second frame (1114). One end of the first frame (1112) is horizontally installed at the inside surface of the main body (110). The second frame (114) is rotatably installed at the edge of the bottom surface of the first frame (1112). The auxiliary visor body (VB1) is installed so as to fully enclose the second frame (1114).

More specifically, a first mounting plate (1116) is installed at one edge of the first frame (1112). A first rotation axis (1118) is axially connected rotatably to the first mounting plate (1116). A second rotation axis (1122) is fixedly installed at the lower part of the first rotation axis (1118) so that both ends thereof may protrude. Second mounting plates (1120) are rotatably installed at each of the protruded ends of the second rotation axis (1122). The second mounting plates (1120) are disposed in parallel face to face with each other. A fixation pin (1124) is inserted into the free end of the second mounting plate (1120). A return spring (1126), of which one end is fixed to the second rotation axis (1122) and the other end is fixed to the fixation pin (1124), is installed at one end of the second rotation axis (1122). The return spring (1126) allows the second frame (1114) to have a force of returning to the direction of the first frame (1112).

Especially, a guide member (1128) is installed at the bottom surface of one edge of the first frame (1112) to guide the rotation direction of the second frame (1114). Preferably, the guide member (1128) is of a triangular shape of which one side is concave.

In addition, a first slave gear (1134) is connected to the upper end of the first rotation axis (1118). A first principal gear (1132) of an auxiliary visor body drive motor (1130) is installed at the first slave gear (1134).

The operation of the embodiment comprising the auxiliary visor body will be explained below.

Referring back to FIGS. 10-13, when sunlight or headlights of other vehicles are introduced into a vehicle during driving, a driver pushes a manual button (not shown) installed near the driver's seat. The auxiliary visor body drive motor (1130) is rotated, and the rotational force rotates the first principal gear (1132). When the first principal gear (1132) is rotated, the first rotation axis (1118) is rotated by the first gear (1134) engaged with the first principal gear (1132). At this process, the second mounting plates (1120) are rotated in a horizontal state with the second frame (1114), and then one of the second mounting plates (1120) is guided along the curved surface of the guide member (1128) to be converted to a vertical state. Referring to FIG. 12 relating to this process, the second frame (1114), at which the auxiliary visor body (VB1) is installed, is placed nearly horizontal with the first frame (1112) in the beginning (shown by the dash single dot line in FIG. 12). Then, the second frame (1114) is rotated at an angle of approximately 45° with respect to the first frame (1112) by the driving force of the auxiliary visor body drive motor (1130) (shown by dotted lines in FIG. 12). Finally, when the driving force of the drive motor (1130) is continuously transmitted, the second frame (1114) is rotated downward in the nearly perpendicular direction of the first frame (1112) (shown by solid lines in FIG. 13).

Accordingly, the frame (1114) connected to the second mounting plate (1120) is rotated downward in the nearly perpendicular direction of the first frame (1112). Then, the auxiliary visor body (VB1) enclosed with the second frame (1114) is positioned in the direction of the side windows (16). The auxiliary visor body (VB1) can shield lights which are introduced into a vehicle through the side windows (16).

Additional embodiments of the electromotive sunvisor assembly according to the present invention as described above will be explained below. These additional embodiments are the ones for the velocity differential generation means according to the first preferred embodiment of the present invention.

FIG. 14 shows the electromotive sunvisor assembly for vehicles according to a second embodiment of the present invention. FIG. 15 shows the state in which the visor body has moved forward. A recess (120a) is formed at one side surface of the main body (120), as shown, and a first rack gear (122) and a second rack gear (122a) are longitudinally formed at the recess (120a) in parallel to each other. A first gear box (124) with a plurality of gears embedded is positioned on the top surface of the upper travel member (170), a first drive gear (124a) connected to the first rack gear (122) is protruded at one side of the bottom surface of the first gear box (124), and a first motor (124b) connected to the gears inside the first gear boxy (124) is installed at the other side of the bottom surface of the first gear box (124). On the contrary, a second gear box (126) with a plurality of gears embedded is installed on the bottom surface of the lower travel member (172), a second drive gear (126a) connected to the second rack gear (122a) is protruded at one side of the bottom surface of the second gear box (126), and a second motor (126b) connected to the gears inside the second gear box (126) is installed at the other side of the bottom surface of the second gear box (126). Especially, the rotational speed of a first motor (124b) is set faster than that of the second motor (126b).

The sunvisor assembly (100) having the above-described constitution operates as described below. That is, when the first motor (124b) and the second motor (126b) are driven by the drive's operation, the rotational forces thereof rotate the first drive gear (124a) and the second drive gear (126a) by the rotation of the gears of the first gear box (124) and the second gear box (126). Then, the first drive gear (124a) moves forward along the first rack gear (122), and the second drive gear (126a) moves forward along the second rack gear (122a). Together, as the upper travel member (170) and the lower travel member (172) moves forward along the upper guide rod (130) and the lower guide rod (132), respectively, the upper travel member (170) moves ahead of the lower travel member (172), and due to the operation of the rotation strip (176a) and the connection link (174), as shown in FIG. 15, as the visor body (VB) connected to the mounting bar (176b) is rotated on the rotary center shaft (176), the angle of the visor body (VB) is converted from a horizontal position to a vertical position.

FIG. 16 is a view showing an electromotive sunvisor assembly for vehicles according to a third embodiment of the present invention. FIG. 17 shows the state in which the visor body has moved forward in FIG. 16. As shown in FIGS. 16 and 17, a working space (220a) is longitudinally formed broadly at the main body (220) with both ends thereof closed. One end of an upper movement rack gear (222) is installed at the backside of the upper travel member (170) installed at the upper guide rod (130) of the main body (220), and one end of a lower movement rack gear (224) is installed at the backside of the lower travel member (172)

installed at the lower guide rod (132). The free ends of the upper movement rack gear (222) and the lower movement rack gear (224) are protruded at one end of the main body (220). A third drive gear (226) and a fourth drive gear (226*a*) are disposed up and down at one end of the main body (220), and the third and fourth drive gears (226, 226*a*) are rotatably connected by a third motor (226*b*) installed on the top surface of the main body (220). Preferably, the diameter of the third drive gear (226) is formed larger than the diameter of the fourth drive gear (226*a*).

The sunvisor assembly (100) having the above-described constitution operates as described below. That is, when the third motor (226*b*) is driven by a driver's operation, the third drive gear (226) and the fourth drive gear (226*a*) are rotated at the same time. Then, the upper movement rack gear (222) and the lower movement rack gear (224) connected to the third and fourth drive gears (226, 226*a*) move together along the upper guide rod (130) and the lower guide rod (132). At this time, the travel speed of the upper travel member (170) is faster than that of the lower travel member (172). As a result, like the embodiment of the present invention as described above, the angle of the visor body (VB) is converted from a horizontal state to a vertical state.

FIG. 18 shows an electromotive sunvisor assembly for vehicles according to a fourth embodiment of the present invention. FIG. 19 shows the state in which the visor body has moved forward in FIG. 18. As shown in FIGS. 18 and 19, the upper travel member (270) and the lower travel member (272) are respectively installed at the upper guide rod (130) and the lower guide rod (132) of the recess (320*a*) of the main body (320). The upper travel member (272) is formed at a seating groove (272*a*) into which the upper travel member (270) is inserted. Each end of a first link (322) and a second link (324) is axially connected rotatably to the top surface of the upper travel member (270) and the lower travel member (272), respectively. At that time, the length of the first link (322) is formed preferably longer than the second link (324) in order to generate a velocity difference between the upper travel member (270*0* and the lower travel member (272). A fourth motor (328) is installed at a connection bar (162) for connecting a guide rail (160) to the main body (320). One end of a third link (326) is fixedly coupled to the top surface of the fourth motor (328), and each free end of the first link (322) and the second link (324) is axially connected rotatably to the other end thereof.

The sunvisor assembly (100) having the above-described constitution operates as described below. That is, when the fourth motor (328) is driven by a driver's operation, the third link (326) is rotated clockwise. The rotational force of the third link (326) is transmitted to the first link (322) and the second link (324). Then, the upper travel member (270) moves forward along the upper guide rod (130), and at the same time, the lower travel member (272) moves forward along the lower guide rod (132). At this time, the travel speed of the upper travel member (270) is faster than that of the lower travel member (272). As a result, like the embodiments as described above, the angle of the visor body (VB) is converted from a horizontal state to a vertical state.

FIG. 20 shows an electromotive sunvisor assembly for vehicles according to a fifth embodiment of the present invention. FIG. 21 shows the state in which the visor body has moved forward in FIG. 20. As shown in FIG. 20, a recess (420*a*) is formed at one side of a main body (420). A first cylinder (422) and a second cylinder (424) using a hydraulic or pneumatic pressure are installed at one closed end of the main body (420). A first operation rod (426) and a second operation rod (428) are installed at the front sides of the first and second cylinders (422, 424) so as to be capable of moving forward and backward. The first operation rod (426) and the second operation rod (428) go through the close end of the main body (420) to be connected to the upper travel member (170) and the lower travel member (172). Especially, the travel speed of the first operation rod (426) of the first cylinder (422) is set faster than that of the second operation rod (428) of the second cylinder (424).

The sunvisor assembly (100) having the above-described constitution operates as described below. When the first cylinder (422) and the second cylinder (424) are driven by a driver's operation, the first operation rod (426) and the second operation rod (428) push the upper travel member (170) and the lower travel member (172) forward. Then, the upper travel member (170) and the lower travel member (172) moves forward along the upper guide rod (130) and the lower guide rod (132). At this time, the travel speed of the upper travel member (170) is faster than that of the lower travel member (172). As a result, the angle of the visor body (VB) is converted from a horizontal state to a vertical state.

FIG. 22 shows an electromotive sunvisor assembly for vehicles according to a sixth embodiment of the present invention. FIG. 23 shows the state in which the visor body has moved forward in FIG. 22. As shown in FIG. 22, a recess (520*a*) is formed at one side of a main body (520). Screw threads are formed on the outer peripheral surfaces of the upper guide rod (130) and the lower guide rod (132). The upper guide rod (130) and the lower guide rod (132) are rotatably installed at the closed ends of the main body (520). A fifth motor (522) and a sixth motor (524) are installed at one ends of the upper guide rod (130) and the lower guide rod (132). The rotation speed of the fifth motor (522) is set faster than that of the sixth motor (524).

The sunvisor assembly (100) having the above-described construction operates as described below. That is, when the fifth motor (522) and the sixth motor (524) are driven by a driver's operation, the upper guide rod (130) and the lower guide rod (132) are rotated in the same direction with a speed difference. Then, the upper travel member (170) and the lower travel member (172) move forward along the upper guide rod (130) and the lower guide rod (132), respectively. At this time, the travel speed of the upper travel member (170) is faster than that of the lower travel member (172). As a result, like the embodiments as described above, the angle of the visor body (VB) is converted from a horizontal position to a vertical position.

Meanwhile, as shown in FIG. 24, either the fifth motor (522) or the sixth motor (524) can be used. At this time, an upper connection gear (526) and a lower connection gear (526*a*) are axially connected rotatably to the closed cross section of the main body (520). The upper connection gear (526) and the lower connection gear (526*a*) are respectively connected to one ends of the upper guide rod (130) and the lower guide rod (132). At this time, the upper guide rod (130) and the lower guide rod (132) are right-hand threaded. An idler (528) is disposed between the upper connection gear (526) and the lower connection gear (526*a*).

On the other hand, as shown in FIG. 25, either the upper guide rod (130) or the lower guide rod (132) is left-hand threaded, and the other may be right-hand threaded. At this time, the upper connection gear (526) and the lower connection gear (526*a*) are directly connected without the idler (528).

FIG. 26 shows an electromotive sunvisor assembly for vehicles according to a seventh embodiment of the present invention. FIG. 27 shows the state in which the visor body has moved forward in FIG. 26. As shown in FIG. 26, a recess (620a) is formed at one side of a main body (620). The main body (620) includes a first linear motor (622) and a second linear motor (624). The first and second linear motors (622, 624) consist of a stator (not shown) and an armature (not shown). An upper guide slot (622a) is formed at one side of the first linear motor (622), and a lower guide slot (624a) is formed at one side of the second linear motor (624). The armature of the first linear motor (622) is connected to the upper travel member (170), and the armature of the second linear motor (624) is connected to the lower travel member (172). The armature of the first linear motor (622) is set faster than the operation speed of the second linear motor (624).

The sunvisor assembly (100) having the above-described construction operates as described below. That is, when the first linear motor (622) and the second linear motor (624) are driven by a driver's operation, the armatures travel along the upper guide slot (622a) and the lower guide slot (624a) by a change of the magnetic field. Then, the upper travel member (170) and the lower travel member (172) connected to each armature travel along the upper guide rod (130) and the lower guide rod (132). At this time, the travel speed of the upper travel member (170) is faster than that of the lower travel member (172). Consequently, the visor body (VB) is converted from a horizontal position to a vertical position.

FIG. 28 shows an electromotive sunvisor assembly for vehicles according to an eighth embodiment of the present invention. FIG. 29 shows the state in which the visor body has moved forward in FIG. 28. As shown in FIG. 28, a recess (720a) is formed at one side of a main body (720). An upper operation rod (372) protrudes upward on the top surface of an upper travel member (370). A lower operation rod (376) protrudes upward on the top surface of the lower travel member (374). A receiving groove (376a) of the upper travel member (370) is formed at the lower travel member (374). Both ends of a connection bar (162) are fixed between the main body (720) and a guide rail (160). The connection bar (162) is spaced at a predetermined height from the guide rail (160) and the upper part of the main body (720). It is to axially connect the a rotational round plate (722) to the bottom surface of the connection bar (162). One side of the rotary round plate (722) is provided with a radial slit (724), into which the upper operation rod (372) and the lower operation rod (376) are inserted to be guided. The axially-connected part of the rotary round plate (722) is connected to a seventh motor (726).

The sunvisor assembly (100) having the above-described construction operates as described below. That is, when the seventh motor (726) is driven by a driver's operation, the rotary round plate is rotated counterclockwise based on the axially-connected part. Then, the upper operation rod (372) and the lower operation rod (376) moves from the outside position of the slit (724) to the inside position thereof. Then, the upper travel member (370) and the lower travel member (374) move forward along the upper guide rod (130) and the lower guide rod (132). At this time, since the upper travel member (370) and the lower travel member (374) travel at a speed proportional to the product of the rotational angular velocity of the rotary round plate (722) and the distance spaced apart from the rotation center, the travel speed of the upper travel member (370), which is positioned at a greater distance from the rotation center, gets faster than that of the lower travel member (374). As a result, the visor body (VB) is converted from a horizontal position to a vertical position.

FIG. 30 shows an electromotive sunvisor assembly for vehicles according to a ninth embodiment of the present invention. As shown in FIG. 30, an operation slot (820) is formed at one side of a main body (820). The main body (820) is tilted so that one end thereof is higher than the other end. An upper guide rod (130) and a lower guide rod (132) are fixed at both closed ends of the main body (820). At this time, the upper guide rod (130) is disposed in such a manner that one end thereof is located at a greater distance with respect to the lower guide rod (132) than the other end. An operation link (822) is folded so that the center of the bar on the straight line may form an acute angle. At this time, one end of the operation link (822) and the folded part are axially connected rotatably to the front surfaces of the upper travel member (370) and the lower travel member (374), respectively. The other end of the operation link (822) is positioned in nearly parallel to the lower guide rod (132). A third rack gear (824) is arranged in a lengthwise direction at the bottom of the main body (820). A third gear box (826) is installed on the bottom surface of the lower travel member (374), and a fifth drive gear (827) to be connected to the third rack gear (824) is axially connected rotatably to the backside of the lower travel member (374). An eighth motor (828) is installed on the top surface of one side of the third gear box (826).

The sunvisor assembly (100) having the above-described construction operates as described below. That is, when the eighth motor (828) is driven by a driver's operation, the gears within the third gear box (826) are interlocked to transmit a rotational force to the fifth drive gear (827). Then, the fifth drive gear (827) moves along the third rack gear (824). Consequently, the upper travel member (370) and the lower travel member (374) move forward along the upper guide rod (130) and the lower guide rod (132). At this time, the upper travel member (370) moves forward ahead of the lower travel member (370). As a result, the visor body (VB) is converted from a horizontal position to a vertical position.

For reference, the velocity differential generation means used in the above-described embodiments may be replaced with a belt, a chain, a wire, a four link, a hydraulic or pneumatic cylinder, a linear motor, a geneva mechanism, etc.

A method for controlling the electromotive sunvisor assembly for vehicles according to the preferred embodiment of the present invention will be explained with reference to the accompanying drawings below.

FIG. 31 is a block diagram showing a method for controlling the electromotive sunvisor assembly for vehicles according to the preferred embodiment of the present invention. FIG. 32 is a flow chart of FIG. 30. As shown in FIGS. 31 and 32, the sunvisor assembly (100) and the auxiliary sunvisor assembly (1100) may be operated either automatically or manually. Although the embodiments by manual operation were explained above, an embodiment by automatic operation will be explained hereinbelow.

Firstly, a change in driver's driving environments is detected. That is, a rotation angle of the backrest of a seat, forward and backward positions of a seat, and the like are adjusted by a seat adjustment device (900). A rotation angle of a side mirror is adjusted by a side mirror adjustment device (910). A rotation angle of a rearview mirror is adjusted by a room mirror adjustment device (920). At this time, an existing memory seat is used to detect the above-described data. A photosensor (960) detects light signals projected through the windshield (14) and the side widows (16) (S1).

The detected light signals are outputted to a memory device (930). Then, the memory device (930) compares the detected light signals with a table obtained through statistics and then outputs the compared data to a central processing unit (940). (S2).

The central processing unit (940), which received the each data, presumes the spatial position of driver's eyes, and senses the intensity and direction of light. After comparing the detected position of driver's eyes and the intensity and direction of light with a motor rotation angle table, the central processing unit (940) outputs control signals corresponding to the each data to a motor driver (950) (S3).

The motor driver (950), which received the control signals, outputs motor drive signals according to the control signals (S4).

The motor (146) and the auxiliary visor body drive motor (1130) for driving the visor body (VB), which received the motor drive signals, are rotated as described above. Accordingly, the rotation angle of the visor body (VB) is adjusted to effectively shield the light according to the position of the driver's eyes and the intensity and direction of light. That is, light incident in the direction of the windshield (14) is shielded by the visor body (VB), and light incident in the direction of the side windows (16) is shielded by the auxiliary visor body (VB1) (S5).

INDUSTRIAL APPLICABILITY

The electromotive sunvisor assembly for vehicles according to the present invention as described above comprises first guide means, second guide means disposed in parallel to the first guide means, first movement means disposed at the first guide means, second movement means disposed at the second guide means, a rotary center shaft which protrudes from the second movement means, a mounting bar which is installed at the rotary center shaft and at which the visor body is fixed and the rotation strip is formed, a connecting link for connecting the rotation strip of the mounting bar with the first movement means, and velocity differential generation means for generating a velocity differential when the first movement means and the second movement means. Due to this constitution, since the sunvisor assembly shield lights manually or automatically by using the visor body as well as the auxiliary visor body when sunlight or the headlights of oncoming vehicles is projected into a vehicle, it allows a driver to drive comfortably.

The invention claimed is:

1. An electromotive sunvisor assembly for vehicles, which is installed within in a receiving room between a roof panel and a headliner to shield lights projected into a vehicle by a visor body, comprising:
    a first guide means and a second guide means which are disposed in parallel to each other;
    a first movement means which is glidingly disposed at the first guide means;
    a second movement means which is glidingly disposed at the second guide means;
    a rotary center shaft which extends horizontally from the second movement means;
    a mounting bar which is rotatably installed at the rotary center shaft and to which the visor body is fixed;
    a rotation strip which is protrudingly formed on the mounting bar so as to be deflected from the rotary center shaft;
    a connecting link, one end of which is axially bonded with one side of the first movement means and the other end of which is axially connected rotatably to the rotation strip; and
    a velocity differential generation means for generating a velocity differential when the first movement means and the second movement means glide along the first guide means and the second guide means while maintaining the connection state of the mounting bar, the rotation strip and the connecting link.

2. The electromotive sunvisor assembly for vehicles according to claim 1, wherein the first guide means and the second guide means are installed at the main body, and the main body comprises:
    an upper body and a lower body through which upper axis holes and lower axis holes penetrate at both ends thereof; and
    a pair of spacing maintenance elements installed at one side of both ends of the upper body and the lower body.

3. The electromotive sunvisor assembly for vehicles according to claim 1, wherein at least one guide roller is rotatably installed at one end of the mounting bar, and a guide rail is installed on the top surface of the headliner so as to guide the guide roller.

4. The electromotive sunvisor assembly for vehicles according to claim 2, wherein the main body further comprises an auxiliary sunvisor assembly for shielding light incident on side windows.

5. The electromotive sunvisor assembly for vehicles according to claim 4, wherein the auxiliary sunvisor assembly comprises:
    a first frame which is horizontally installed at one side of the main body;
    a second frame which is disposed below the first frame to rotate on one side edge of the first frame;
    a rotation member which is installed at one side edge of the first frame and the second first frame and which rotates the second frame from a horizontal position to a vertical position with respect to the first frame; and
    an auxiliary visor body for covering the second frame as a whole.

6. The electromotive sunvisor assembly for vehicles according to claim 5, wherein the rotation member comprises:
    a first mounting plate which is installed at one side edge of the first frame;
    a first rotation axis which is axially connected rotatably to the first mounting plate;
    a second rotation axis which is fixedly installed at the lower part of the first rotation axis so that both ends thereof may protrude;
    plural second mounting plates which are rotatably installed at both ends of the second rotation axis;
    a fixation pin which is installed at the free end of the second mounting plate;
    a return spring of which one end is fixed at the second rotation axis and the other end is coupled to the fixation pin;
    a guide member which is installed on the bottom surface of one edge of the first frame to guide the rotation direction of the second frame, one side of the guide member being formed concave;
    a first slave gear coupled to the upper part of the first rotation axis;
    a first principal gear which is installed on the top surface of the mounting plate and is coupled to the first slave gear; and
    an auxiliary visor body drive motor which is coupled to the first principal gear to generate a rotational force.

7. The electromotive sunvisor assembly for vehicles according to claim 2, wherein the first guide means and the second guide means are rotatably installed at the main body; screw threads are formed at the outer peripheries of the first guide means and second guide means; and a fifth motor and a sixth motor having a velocity differential to each other are installed at one ends of an upper guide rod and a lower guide rod, so as to generate a velocity differential when the first movement means and the second movement means glide along the first guide means and the second guide means.

8. The electromotive sunvisor assembly for vehicles according to claim 2, wherein when both the first guide means and the second guide means are right-hand threaded, either the fifth motor or the sixth motor is coupled to one of the first guide means and the second guide means; an upper connection gear is coupled to the first guide means and a lower connection gear is coupled to the second guide means; and an idler is installed between the upper connection gear and the lower connection gear.

9. The electromotive sunvisor assembly for vehicles according to claim 2, wherein one of the first guide means and the second guide means is left-hand threaded and the other is right-hand threaded; either the fifth motor or the sixth motor is coupled to one of the first guide means and the second guide means; the connection gear is coupled to the first guide means and the lower connection gear is coupled to the second guide means; and the upper connection gear and the lower connection gear are directly coupled to each other.

10. The electromotive sunvisor assembly for vehicles according to claim 2, wherein the velocity differential generation means comprises:
 a pair of first pulleys;
 a pair of second pulleys having a smaller diameter than that of the first pulleys;
 a pair of rotation axes which axially connect the first pulleys and the second pulleys as a set rotatably to both ends of the upper body and the lower body;
 a first belt and a second belt which are respectively connected to the first pulleys and the second pulleys to convert a rotary motion into a straight line motion; and
 a motor which is geared to one side section of the rotation axes to provide a rotational force.

11. The electromotive sunvisor assembly for vehicles according to claim 2, wherein a recess is formed on one side surface of the main body;
 a first rack gear and a second rack gear are longitudinally formed on the recess in parallel to each other;
 a first gear box with a plurality of gears embedded is positioned on the top surface of the first guide means;
 a first drive gear connected to the first rack gear (122) protrudes at one side of the bottom surface of the first gear box; a first motor connected to the gears inside the first gear box is installed at the other side of the bottom surface of the first gear box;
 a second gear box with a plurality of gears embedded is installed at the bottom surface of the second movement means;
 a second drive gear connected to the second rack gear (122a) protrudes at one side of the bottom surface of the second gear box; and
 a second motor connected to the gears inside the second gear box is installed at the other side of the bottom surface of the second gear box, so as to generate a velocity differential to each other when the first movement means and the second movement means glide along the first guide means and the second guide means.

12. The electromotive sunvisor assembly for vehicles according to claim 2, wherein a seating groove, into which the movement means is inserted, is formed at the second movement means;
 one ends of a first link and a second link are axially connected rotatably to the first movement means and the second movement means;
 the first link is formed longer than the second link in order to generate a velocity differential between the first movement means and the second movement means;
 one end of a third link is fixedly coupled to the fixed ends of the first link and the second link; and
 the other end of the third link is axially connected rotatably to a fourth motor, so as to generate a velocity differential to each other when the first movement means and the second movement means glide along the first guide means and the second guide means.

13. The electromotive sunvisor assembly for vehicles according to claim 2, wherein a first cylinder and a second cylinder using a hydraulic or pneumatic pressure are installed at one closed end of the main body;
 a first operation rod and a second operation rod are installed at the front sides of the first cylinder and the second cylinder so as to be capable of moving forward and backward;
 the first operation rod and the second operation rod go through the closed end of the main body to be connected to the first movement means and the second movement means; and
 the travel speed of the first operation rod of the first cylinder is set faster than that of the second operation rod of the second cylinder, so as to generate a velocity differential to each other when the first movement means and the second movement means glide along the first guide means and the second guide means.

14. The electromotive sunvisor assembly for vehicles according to claim 2, wherein a first linear motor and a second linear motor are installed at the main body horizontally with respect to each other;
 the first linear motor and the second linear motor consist of a stator and an armature;
 an upper guide slot is formed at one side of the first linear motor and a lower guide slot is formed at one side of the second linear motor;
 the armature of the first linear motor is connected to the first movement means;
 the armature of the second linear motor is connected to the second movement means; and
 the armature of the first linear motor is set faster than the operation speed of the second linear motor, so as to generate a velocity differential to each other when the first movement means and the second movement means glide along the first guide means and the second guide means.

15. The electromotive sunvisor assembly for vehicles according to claim 2, wherein an upper operation rod protrudes upward on the top surface of the first movement means;
 a lower operation rod protrudes upward on the top surface of the second movement means;
 a receiving groove of the first movement means is formed at the second movement means;
 a connection bar is installed across between the main body and a guide rail;
 the connection bar is spaced at a predetermined height from the guide rail and the upper part of the main body;

a rotational round plate is axially connected to the bottom surface of the connection bar;

one side of the rotary round plate is provided with a radial slit, into which the upper operation rod and the lower operation rod are inserted to be guided;

the axially-connected part of the rotary round plate is connected to a seventh motor.

16. An electromotive sunvisor assembly for vehicles, which is installed in a receiving room between a roof panel and a headliner to shield lights projected into a vehicle by a visor body, comprising:

first guide means;

second guide means which is tilted in such a manner that one end thereof is higher and the other end there of is lower with respect to the first guide means;

first movement means which is glidingly disposed at the first guide means;

second movement means which is glidingly disposed at the second guide means;

a rotary center shaft which extends horizontally from the second movement means;

a mounting bar which is rotatably installed at the rotary center shaft and to which the visor body is fixed;

a rotation strip which is protrudingly formed on the mounting bar so as to be deflected from the rotary center shaft;

a connecting link, one end of which is axially bonded with one side of the first movement means and the other end of which is axially connected rotatably to the rotation strip; and velocity differential generation means for generating a velocity differential when the first movement means and the second movement means glide along the first guide means and the second guide means while maintaining the connection state of the mounting bar, the rotation strip and the connecting link.

17. A method for controlling the electromotive sunvisor assembly for vehicles according to claim 1, comprising:

a sensor detecting degrees of variations in the driving environments of a driver;

the sensor generating the resultant variation data and ouputting the data to a central processing unit;

the central processing unit generating control signals corresponding to each data inputted from the sensor and outputting the control signals to a motor drive;

the motor drive outputting motor drive signals to a motor according to the control signals inputted from the central processing unit; and the motor being actuated according to the motor drive signals.

18. The method for controlling the electromotive sunvisor assembly for vehicles according to claim 17, wherein the detected signals are a rotation angle of the backrest of a driver's seat, forward and backward positions of a seat, and a rotation angle of a rearview mirror.

19. The method for controlling the electromotive sunvisor assembly for vehicles according to claim 18, wherein the detected signals further include photosensor signals.

* * * * *